United States Patent
Yu et al.

(10) Patent No.: US 12,067,475 B2
(45) Date of Patent: Aug. 20, 2024

(54) IMAGE FORGERY DETECTION VIA HEADPOSE ESTIMATION

(71) Applicant: PayPal, Inc., San Jose, CA (US)

(72) Inventors: Xiaodong Yu, Singapore (SG); Jiazheng Zhang, Singapore (SG); Jiyi Zhang, Singapore (SG); Quan Jin Ferdinand Tang, Singapore (SG); Shanshan Peng, Singapore (SG); Yuzhen Zhuo, Singapore (SG); Hong Qian, Shanghai (CN); Runmin Wen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 228 days.

(21) Appl. No.: 17/236,085

(22) Filed: Apr. 21, 2021

(65) Prior Publication Data

US 2022/0318597 A1  Oct. 6, 2022

(51) Int. Cl.
  *G06N 3/00* (2023.01)
  *G06N 3/045* (2023.01)
  (Continued)

(52) U.S. Cl.
  CPC .............. *G06N 3/045* (2023.01); *G06N 3/08* (2013.01); *G06T 7/11* (2017.01); *G06T 7/70* (2017.01);
  (Continued)

(58) Field of Classification Search
  CPC .......... G06N 3/045; G06N 20/10; G06N 3/08; G06T 7/11; G06T 2207/10016;
  (Continued)

(56) References Cited

U.S. PATENT DOCUMENTS

2018/0351956 A1\* 12/2018 Verma .................... H04W 12/08
2019/0005359 A1\*  1/2019 Wilf ..................... G06F 18/2413
(Continued)

FOREIGN PATENT DOCUMENTS

CN     107729847 A    2/2018
CN     109255299 A    1/2019
(Continued)

OTHER PUBLICATIONS

Li et al Seeing Your Face Is Not Enough: An Inertial Sensor-Based Liveness Detection for Face Authentication, CCS '15: Proceedings of the 22nd ACM SIGSAC Conference on Computer and Communications Security, pp. 1558-1569, Oct. 2015.\*
(Continued)

*Primary Examiner* — Ping Y Hsieh
*Assistant Examiner* — Xiao Liu
(74) *Attorney, Agent, or Firm* — Greenberg Traurig, LLP

(57) ABSTRACT

Systems and/or techniques for facilitating image forgery detection via headpose estimation may include a system that can receive a document from a client device. The system can identify, by executing a first trained machine learning model, an object that is depicted in the document. The system can determine, by executing a second trained machine learning model, a pose of the object. The system can determine, by executing a third trained machine learning model, whether the document is authentic or forged based on the pose of the object. The system can, in response to determining that the document is forged, transmit an unsuccessful validation message to the client device.

20 Claims, 12 Drawing Sheets

(51) Int. Cl.
*G06N 3/08* (2023.01)
*G06T 7/11* (2017.01)
*G06T 7/70* (2017.01)

(52) U.S. Cl.
CPC .............. *G06T 2207/20081* (2013.01); *G06T 2207/20084* (2013.01); *G06T 2207/20132* (2013.01); *G06T 2210/12* (2013.01)

(58) Field of Classification Search
CPC ....... G06T 2207/30201; G06T 2210/12; G06T 3/60; G06T 3/0006; G06T 2207/20081; G06T 2207/20084; G06T 2207/20132; G06F 18/24; G06F 18/241; G06F 18/253; G06F 30/27; G06F 21/31; G06V 10/82; G06V 40/172; G06V 40/168; G06V 10/764; G06V 40/16; G06V 40/40; G06Q 20/40145; H04L 63/0853; H04L 63/0861; H04L 63/08; H04L 25/0254
See application file for complete search history.

(56) References Cited

U.S. PATENT DOCUMENTS

2020/0394392 A1* 12/2020 Wang ............... G06V 40/40
2021/0056291 A1* 2/2021 Doublet ............ G06V 40/18

FOREIGN PATENT DOCUMENTS

| CN | 111445454 A | 7/2020 |
| CN | 111191539 B | 1/2021 |
| CN | 112560850 A | 3/2021 |
| WO | 2020/212619 A1 | 10/2020 |

OTHER PUBLICATIONS

Bakkali et al, Face Detection in Camera Captured Images of Identity Documents under Challenging Conditions, arXiv: 1911.03567v1 Nov. 8, 2019.*
Yang et al, Exposing Deep Fakes using Inconsistent Head Poses, ICASSP (Year: 2019).*
Rossler et al, FaceForensics++: Learning to Detect Manipulated Facial Images, ICCV (Year: 2019).*
Shi et al, Real-Time Rotation-Invariant Face Detection with Progressive Calibration Networks, CVPR (Year: 2018).*
Zhou et al, Rotation-Invariant Face Detection with Multi-task Progressive Calibration Networks, ICPRAI: Pattern Recognition and Artificial Intelligence, pp. 513-524 (Year: 2020).*
Li et al Seeing Your Face Is Not Enough: An Inertial Sensor-Based Liveness Detection for Face Authentication, CCS '15: Proceedings of the 22nd ACM SIGSAC Conference on Computer and Communications Security, pp. 1558-1569, October (Year: 2015).*
Ariz, M. et al. | Robust and accurate 2D-tracking-based 3D positioning method: Application to head pose estimation. Computer Vision and Image Understanding 180 (2019) 3-22, 2 pages.
Shi, X et al | Real-Time Rotation-Invariant Face Detection with Progressive Calibration Networks. arXiv:1804.06039v1, Apr. 17, 2018, 9 pages.
International Search Report and Written Opinion received for PCT Application Serial No. PCT/CN2021/084392 dated Dec. 30, 2021, 9 pages.

\* cited by examiner

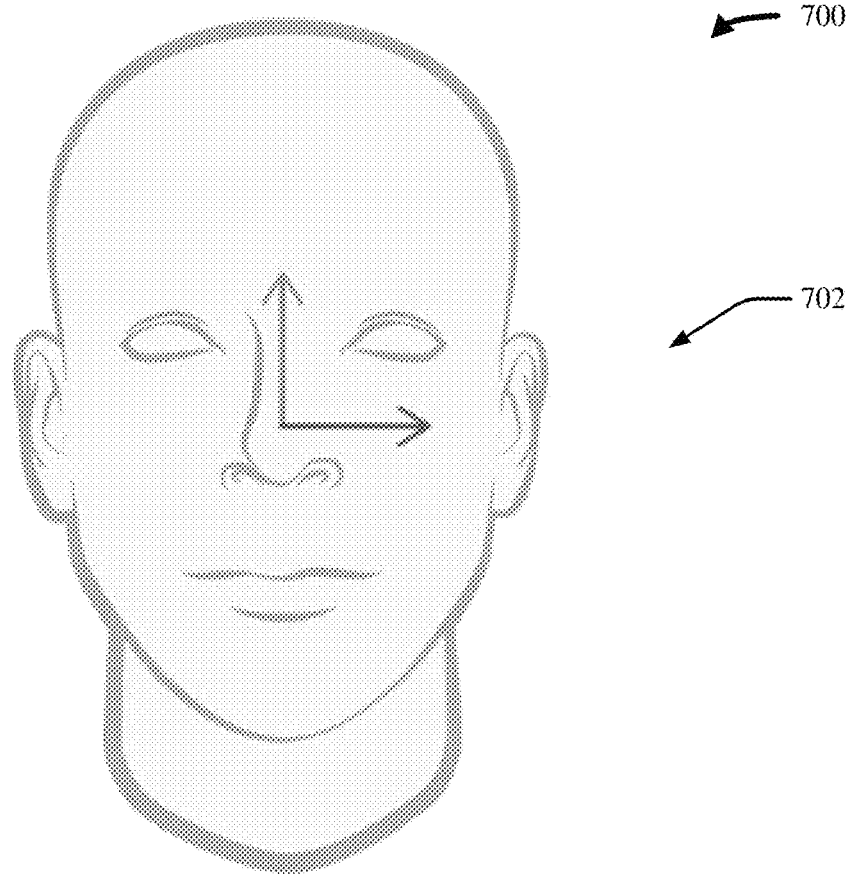
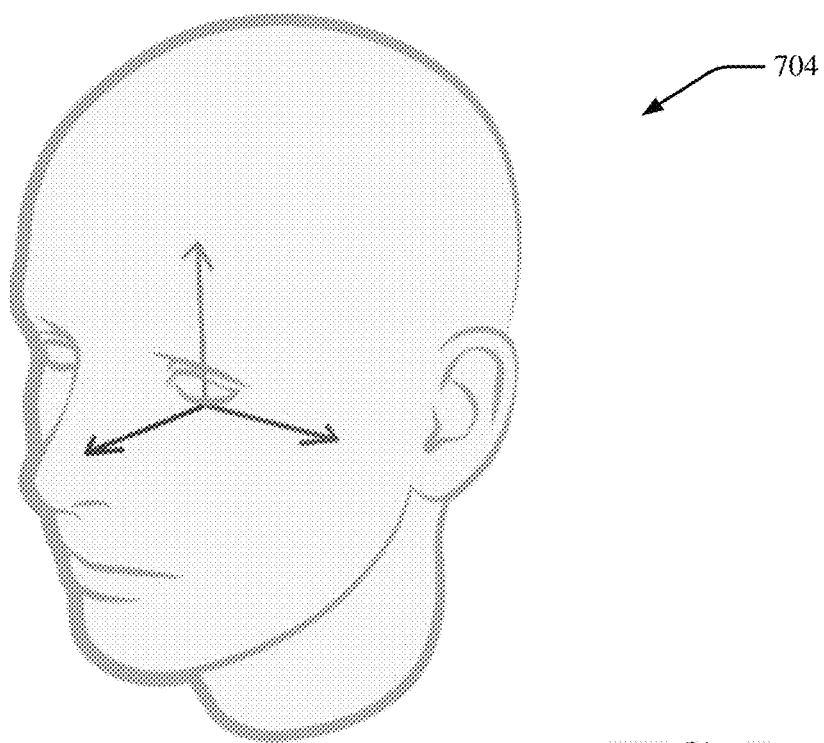
FIG. 7

IMAGE FORGERY DETECTION VIA HEADPOSE ESTIMATION

TECHNICAL FIELD

The subject disclosure relates generally to forgery detection, and more specifically to image forgery detection via headpose estimation.

BACKGROUND

Participation in various activities can require presentation of a proof-of-identity document by a person and/or other entity. A proof-of-identity document can depict a face of the person and/or other entity. To ensure that the person and/or other entity is permitted to participate in the activity, it can be desired to evaluate the authenticity of the proof-of-identity document. Some conventional techniques for evaluating such authenticity include manual inspection of the proof-of-identity document. However, manual inspection can be highly subjective and error-prone. Other conventional techniques for evaluating such authenticity include automated inspection of the proof-of-identity document in search for watermarks or ink mismatches. However, some forgery techniques can replicate watermarks or eliminate ink mismatches, so as to fool such conventional automated inspection. Accordingly, systems and/or techniques that can facilitate other types of automated inspection of proof-of-identity documents can be desirable.

BRIEF DESCRIPTION OF THE DRAWINGS

FIG. 7 illustrates example, non-limiting images of an authentic headpose and a forged headpose in accordance with one or more embodiments described herein.

DETAILED DESCRIPTION

Figure 1:
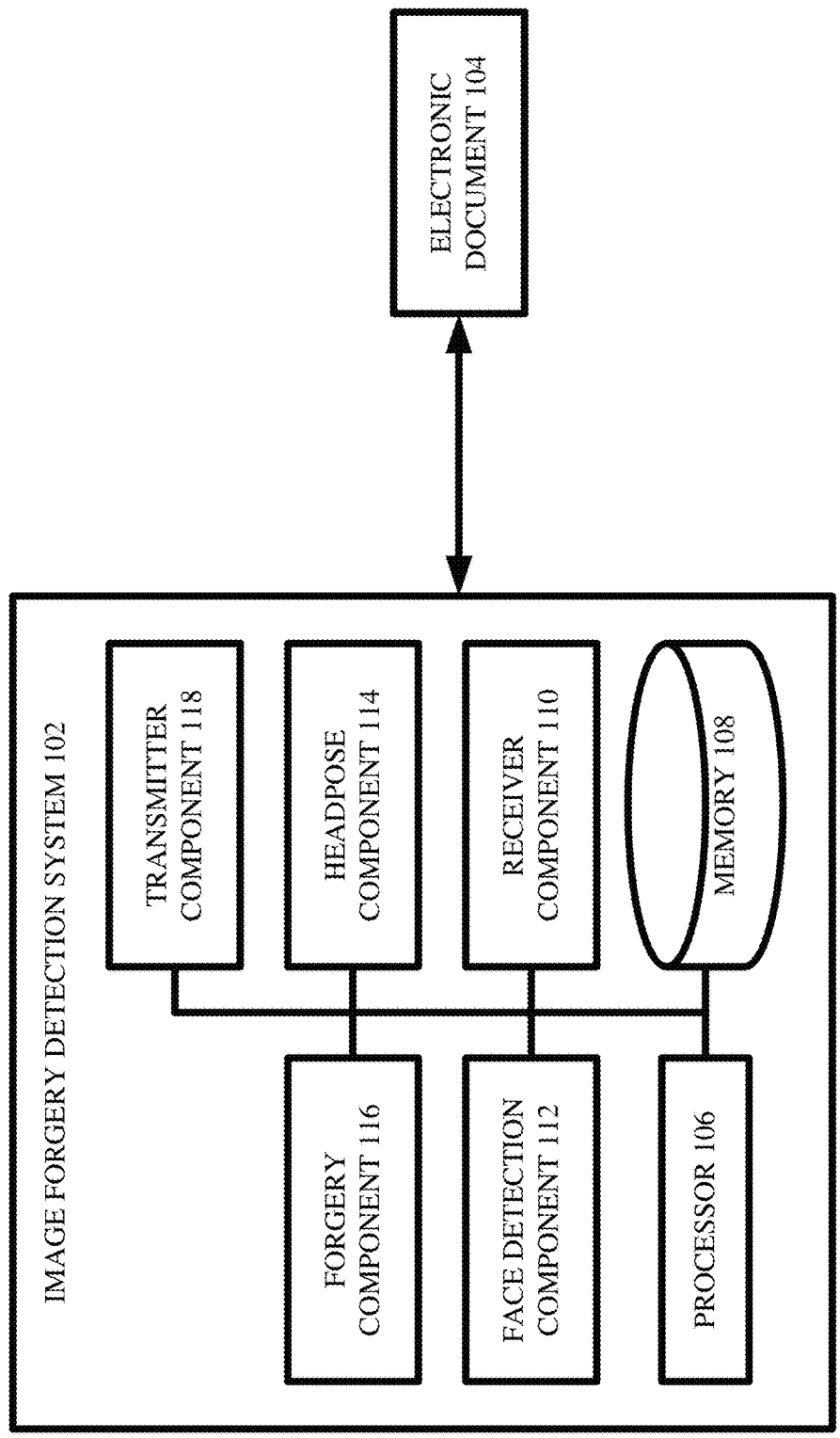
FIG. 1 illustrates a high-level block diagram of an example, non-limiting system that facilitates image forgery detection via headpose estimation in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, participation in various activities can require presentation of a proof-of-identity document by a person and/or other entity. Non-limiting examples of such activities can include voting in governmental elections, purchasing age-restricted products/services, entering clearance-restricted buildings and/or areas, and/or opening, closing, viewing, and/or editing financial accounts. In various cases, a person and/or other entity desiring to participate in any of such activities can be required to present a proof-of-identity document (and/or an electronic copy of a proof-of-identity document) prior to such participation. For example, as a prerequisite to permitting someone to vote, a poll worker and/or electronic voting kiosk can require that a valid proof-of-identity document (e.g., an electronic copy of a valid proof-of-identity document) be presented. As another example, as a prerequisite to permitting someone to purchase an age-restricted product/service, a salesclerk and/or electronic point-of-sale kiosk can require that a valid proof-of-identity document (e.g., an electronic copy of a valid proof-of-identity document) be shown. As yet another example, as a prerequisite to unlocking a door to a clearance-restricted building or area, a security guard and/or electronic security kiosk can require that a valid proof-of-identity document (e.g., an electronic copy of a valid proof-of-identity document) be presented. As still another example, as a prerequisite to permitting someone to open, close, view, and/or update a bank account, a bank teller and/or electronic banking kiosk can require that a valid proof-of-identity document (e.g., an electronic copy of a valid proof-of-identity document) be shown.

In various cases, a proof-of-identity document associated with a person and/or other entity can be any suitable document and/or image that depicts a face of the person and/or other entity, and/or that indicates any other suitable identification information associated with the person and/or other entity (e.g., that indicates the legal name of the person and/or other entity, date of birth of the person and/or other entity, residential address of the person and/or other entity, height and/or weight of the person and/or other entity). Non-limiting examples of a proof-of-identity document can include a driver's license, a passport, a visa, a student identification card, and/or an employee identification card.

To ensure that the person and/or other entity is permitted to participate in a particular activity, it can be desired to evaluate and/or validate the authenticity of the proof-of-identity document. As mentioned above, some conventional techniques for evaluating such authenticity include manual inspection of the proof-of-identity document. Unfortunately, manual inspection can be highly subjective and error-prone. As also mentioned above, other conventional techniques for evaluating such authenticity include automated inspection of the proof-of-identity document in search for watermarks or ink mismatches. That is, an electronic image of the proof-of-identity document can be captured and analyzed by a computerized device, which computerized device can be configured to detect the presence and/or absence of predetermined watermarks in the proof-of-identity document, and/or to detect the presence and/or absence of mismatched ink colors in the proof-of-identity document. However, there exist some forgery techniques that can accurately replicate watermarks and/or that can substantially eliminate ink mismatches. Such forgery techniques can thus fool conventional techniques that facilitate automated inspection of proof-of-identity documents. Moreover, conventional techniques that facilitate automated inspection of proof-of-identity documents heavily rely on receiving a proof-of-identity document in a standardized orientation (e.g., the proof-of-identity document generally should be presented in an upright orientation and/or non-rotated orientation). When such conventional techniques receive as input proof-of-identity documents that are not presented in such a standardized orientation (e.g., which can often be the case in practice), they can exhibit significantly reduced forgery detection accuracy. Accordingly, systems and/or techniques that can address one or more of these technical problems can be desirable.

Various embodiments described herein can address one or more of these technical problems. One or more embodiments described herein include systems, computer-implemented methods, apparatus, and/or computer-program products that can facilitate image forgery detection via headpose estimation. In other words, various embodiments described herein can include a computerized tool (e.g., any suitable combination of computer-executable hardware and/or computer-executable software) that can electronically receive an electronic image of a proof-of-identity document, that can electronically analyze the electronic image of the proof-of-identity document so as to determine a headpose of a face that is depicted in the proof-of-identity document, and that can electronically infer whether the proof-of-identity document is authentic or forged based on the determined headpose. No conventional technique for facilitating automated inspection of proof-of-identity documents leverages headpose to determine whether a proof-of-identity document is authentic or forged. Accordingly, various embodiments described herein constitute a new technique by which the validity of proof-of-identity documents can be evaluated.

In various embodiments, a computerized tool as described herein can comprise a receiver component, a face detection component, a headpose component, a forgery component, and/or a transmitter component.

In various embodiments, the receiver component of the computerized tool can electronically receive and/or can otherwise electronically access an electronic document. In various cases, the receiver component can electronically retrieve the electronic document from any suitable data structure (e.g., graph data structure, relational data structure, hybrid data structure) that is electronically accessible to the receiver component, whether the data structure is centralized and/or decentralized, and/or whether the data structure is local to and/or remote from the receiver component. In various other cases, any suitable computing device can electronically transmit the electronic document to the receiver component. In any case, the receiver component can electronically access the electronic document, such that other components of the computerized tool can be able to interact with (e.g., read, write, copy, edit) the electronic document.

In various instances, the electronic document can be an electronic copy and/or an electronic version of a proof-of-identity document. For example, in some cases, the electronic document can be a scanned image of the proof-of-identity document. As mentioned above, the proof-of-identity document can be any suitable document that depicts a face of a person and/or other entity, such as a driver's license, a passport, and/or a visa. Accordingly, the electronic document can also depict the face of the person and/or other entity.

In various embodiments, the face detection component of the computerized tool can electronically analyze the electronic document so as to detect the face that is depicted in the electronic document. More specifically, the face detection component can electronically execute and/or otherwise electronically facilitate the execution of a first trained machine learning model on the electronic document. In various aspects, the first trained machine learning model can be configured to receive as input the electronic document and to produce as output a cropped image of the face that is depicted in the electronic document.

In various instances, the first trained machine learning model can exhibit any suitable machine learning architecture. For instance, the first trained machine learning model can, in some cases, be an artificial neural network having any suitable number of layers, any suitable numbers of neurons in various layers, any suitable activation functions, and/or any suitable inter-neuron connectivity patterns. In other cases, the first trained machine learning model can exhibit any other suitable machine learning architecture (e.g., can be a support vector machine, a logistic regression model, a naïve Bayes model). In any case, the first trained machine learning model can be trained in any suitable fashion (e.g., via supervised training, unsupervised training, reinforcement learning) to electronically receive the electronic document as input and to electronically generate a cropped image of the face that is depicted in the electronic document as output.

In various aspects, it can be the case that the face is not depicted in the electronic document in an upright orientation. Instead, it can be the case that the face is depicted in the electronic document in some rotated and/or otherwise non-upright orientation. For example, the face can be depicted as being upside down in the electronic document (e.g., represented by a rotation of about 180 degrees from upright), the face can be depicted as being sideways in the electronic document (e.g., represented by a rotation of about 90 degrees from upright), and/or the face can be depicted as being at any other suitable angle of rotation within the electronic document.

In such cases, the first trained machine learning model can be a progressive calibration network. In various aspects, the progressive calibration network can be an artificial neural network that comprises an ensemble of any suitable number of sub-networks that are serially-linked (e.g., the output of one sub-network can be the input to another sub-network). In various instances, the ensemble of sub-networks can detect the face depicted in the electronic document and can align a bounding box with the face via a sequence of progressively finer rotations of the bounding box. For instance, a first sub-network in the progressive calibration network can be trained and/or configured to receive as input the electronic document and to produce as output an upright bounding box around the face that is depicted in the electronic document. Because the bounding box can be upright and because the depicted face can be in some non-upright orientation, the bounding box can be not yet aligned with the depicted face. In various aspects, a second sub-network in the progressive calibration network can be trained and/or configured to receive as input the electronic document having the upright bounding box circumscribing the depicted face and to rotate the bounding box by some first amount (e.g., 0 degrees and/or 180 degrees) based on the non-upright orientation of the depicted face. At this point, the bounding box can still be not aligned with the depicted face, but the bounding box can be considered as being more closely aligned with the depicted face than the bounding box previously was. In various instances, a third sub-network in the progressive calibration network can be trained and/or configured to receive as input the electronic document having the bounding box as rotated by the second sub-network and to further rotate the bounding box by some second amount that is finer than the first amount (e.g., 0 degrees, 90 degrees clockwise, and/or 90 degrees counter-clockwise) based on the non-upright orientation of the depicted face. At this point, the bounding box can again be not yet aligned with the depicted face, but the bounding box can nevertheless be considered as being even more closely aligned with the depicted face than the bounding box previously was. In various aspects, the progressive calibration network can further include any suitable number of additional sub-networks that can progressively rotate the bounding box by finer and finer amounts until the bounding box is aligned with the depicted face (e.g., until some characteristic dimension and/or axis of the bounding box is within any suitable threshold margin of being parallel with and/or perpendicular to some characteristic dimension and/or axis of the depicted face). Accordingly, the progressive calibration network can produce as output the aligned bounding box and the face as depicted within the aligned bounding box. In various cases, the progressive calibration network can crop out any of the electronic document that is not circumscribed by the bounding box. In various instances, the progressive calibration network can output the aligned bounding box in an upright orientation. Accordingly, the face as depicted within the bounding box can likewise now be output in an upright orientation. In various aspects, the outputted bounding box as aligned with the depicted face can be considered as the cropped image of the depicted face.

Those having ordinary skill in the art will appreciate that the above-provided rotation angles (e.g., 0 degree, 90 degrees, 180 degrees) are mere non-limiting examples. In various cases, any suitable rotation angles can be implemented by the progressive calibration network.

In various embodiments, the headpose component of the computerized tool can electronically analyze the cropped image of the face so as to determine a headpose of the face. More specifically, the headpose component can electronically execute and/or otherwise electronically facilitate the execution of a second trained machine learning model on the cropped image of the face. In various aspects, the second trained machine learning model can be configured to receive as input the cropped image of the face and to produce as output a headpose of the face. In various instances, the headpose of the face can a three-tuple comprising a yaw angle, a roll angle, and/or a pitch angle. In various cases, such a three-tuple can respectively describe the yaw, roll, and/or pitch of the face as depicted in the electronic document.

In various instances, the second trained machine learning model can exhibit any suitable machine learning architecture. For instance, the second trained machine learning model can, in some cases, be an artificial neural network having any suitable number of layers, any suitable numbers of neurons in various layers, any suitable activation functions, and/or any suitable inter-neuron connectivity patterns. In other cases, the second trained machine learning model can exhibit any other suitable machine learning architecture (e.g., can be a support vector machine, a logistic regression model, a naïve Bayes model). In any case, the second trained machine learning model can be trained in any suitable fashion (e.g., via supervised training, unsupervised training, reinforcement learning) to electronically receive the cropped image of the face as input and to electronically determine a headpose (e.g., a yaw angle, roll angle, and/or pitch angle) of the face as output.

In various embodiments, the forgery component of the computerized tool can electronically analyze the outputted headpose of the face so as to determine whether the proof-of-identity document is authentic or instead forged. More specifically, the forgery component can electronically execute and/or otherwise electronically facilitate the execution of a third trained machine learning model on the headpose of the face. In various aspects, the third trained machine learning model can be configured to receive as input the three-tuple defining the headpose of the face and to produce as output a classification that indicates the authenticity of the three-tuple (e.g., that labels the three-tuple as either authentic or forged).

In various instances, the third trained machine learning model can exhibit any suitable machine learning architecture. For instance, the third trained machine learning model can, in some cases, be an artificial neural network having any suitable number of layers, any suitable numbers of neurons in various layers, any suitable activation functions, and/or any suitable inter-neuron connectivity patterns. In other cases, the third trained machine learning model can exhibit any other suitable machine learning architecture (e.g., can be a support vector machine, a logistic regression model, a naïve Bayes model). In any case, the third trained machine learning model can be trained in any suitable fashion (e.g., via supervised training, unsupervised training, reinforcement learning) to electronically receive the determined headpose (e.g., the yaw angle, roll angle, and/or pitch angle) as input and to electronically determine as output whether the determined headpose corresponds to an authentic proof-of-identity document or a forged proof-of-identity document.

In some embodiments, the forgery component can lack the third trained machine learning model. In such cases, the forgery component can instead compare the determined three-tuple (e.g., the yaw angle, the roll angle, and/or the pitch angle) defining the headpose of the depicted face to any suitable thresholds. If the determined three-tuple complies with such thresholds, the forgery component can infer that the proof-of-identity document is authentic. On the other hand, if the determined three-tuple does not comply with such thresholds, the forgery component can infer that the proof-of-identity document is forged.

In various embodiments, the transmitter component of the computerized tool can electronically generate and/or transfer a validation message based on the determination made by the forgery component. For example, if the forgery component determines that the proof-of-identity document is authentic, the transmitter component can generate and/or transmit a successful validation message to any suitable computing device. On the other hand, if the forgery component determines that the proof-of-identity document is forged, the transmitter component can generate and/or transmit an unsuccessful validation message to any suitable computing device.

In various embodiments, the computerized tool as described herein can receive a scanned image of a proof-of-identity document, can analyze the scanned image to determine a headpose of a face that is depicted in the proof-of-identity document, and can infer whether the proof-of-identity document is authentic or forged based on the determined headpose. In other words, the computerized tool can, in various aspects, leverage the fact that authentic proof-of-identity documents generally follow standard rules with respect to headpose. For example, an authentic proof-of-identity document (e.g., an authentic driver's license, an authentic passport, an authentic visa) can depict a face with a standardized forward-facing headpose. That is, the eyes of the face can be horizontally aligned, the face can be not rolled to its right side and/or left side by more than a threshold amount, the face can be not pitched upward and/or downward by more than a threshold amount, and/or the face can be not yawed to its right side and/or left side by more than a threshold amount. In contrast, a forged proof-of-identity document, which can be created through photo-editing tools, can generally fail to follow such standard rules with respect to headpose. For example, a forged proof-of-identity document (e.g., a forged driver's license, a forged passport, a forged visa) can include an image of a face that has been copied and/or pasted onto an official-looking document background, and such face can fail to conform to the standardized forward-facing headpose. That is, the eyes of the face can be not horizontally aligned, the face can be rolled to its right side and/or left side by more than a threshold amount, the face can be pitched upward and/or downward by more than a threshold amount, and/or the face can be yawed to its right side and/or left side by more than a threshold amount. Accordingly, in various embodiments, the computerized tool described herein can determine the headpose of a face depicted in a proof-of-identity document and can evaluate an authenticity of the proof-of-identity document based on the determined headpose.

Moreover, the computerized tool described herein can, in various embodiments, be agnostic to an initial orientation of the face as depicted in the electronic document (e.g., as depicted in the electronic copy of the proof-of-identity document). This can be due to the first machine learning model, which can be a progressive calibration network, as mentioned above. As explained herein, the progressive calibration network can be configured so as to receive as input the electronic document and to produce as output a cropped image of the face depicted in the electronic document, wherein the cropped image of the face is in an upright orientation (e.g., and/or any other suitable standardized orientation, as desired). Moreover, the progressive calibration network can output such a cropped image of the face, regardless of the original orientation of the face as depicted in the electronic document. That is, no matter how rotated and/or how non-upright the face is as originally depicted in the electronic document, the progressive calibration network can output an upright and cropped image of the face. Because this cropped image of the face can be in an upright orientation, the second machine learning model can more consistently, precisely, and/or accurately determine the headpose (e.g., yaw, pitch, roll) of the face. In still other words, embodiments of the computerized tool described herein can be unimpeded by the orientation in which the proof-of-identity document is presented to the computerized tool. For example, the electronic document can depict the proof-of-identity document as being upright, upside down, sideways, and/or slanted. Accordingly, the face that is depicted in the proof-of-identity document can likewise be upright, upside down, sideways, and/or slanted. Regardless of such orientation, the computerized tool can accurately determine a headpose of the face (e.g., due to the implementation of the progressive calibration network). In stark contrast, as mentioned above, conventional techniques that facilitate automated inspection of proof-of-identity documents can be heavily negatively impacted by the orientation in which they are presented with a proof-of-identity document (e.g., such conventional techniques can yield inaccurate results when a sideways and/or slanted proof-of-identity document is analyzed).

To help clarify some of the above discussion, consider the following non-limiting example. Suppose that a customer desires to open a financial account. Accordingly, the customer can utilize a computing device (e.g., a laptop computer, a desktop computer, a smart phone) to interact with a computerized financial processor. In various cases, before the computerized financial processor permits the customer to open a financial account, the computerized financial processor can electronically request a proof-of-identity document from the customer. In various instances, the customer can provide, via the computing device, a scanned image of his/her driver's license to the computerized financial processor. That is, the computerized financial processor can electronically receive the scanned image of the driver's license from the computing device. In various cases, the computerized financial processor can execute a first trained machine learning model, which can be configured to receive as input the scanned image of the driver's license and to produce as output a cropped image of the customer's face as depicted in the driver's license. In some cases, the driver's license can be depicted in some non-upright orientation in the scanned image, meaning that the customer's face can also be depicted in such non-upright orientation. Accordingly, the first trained machine learning model can be configured to output the cropped image of the customer's face so that the cropped image is in an upright orientation. In various aspects, the computerized financial processor can execute a second trained machine learning model, which can be configured to receive as input the cropped image of the customer's face and to produce as output a three-tuple (e.g., yaw angle, roll angle, and/or pitch angle) defining the headpose of the customer's face. In various instances, the computerized financial processor can execute a third trained machine learning model, which can be configured to receive as input the three-tuple defining the headpose of the customer's face and to produce as output a classification that labels the customer's driver's license as either authentic or forged. If the computerized financial processor determines that the driver's license is authentic (e.g., if the computerized financial processor determines that the customer's face is not yawed, pitched, and/or rolled by more than a threshold amount as depicted in the driver's license), the computerized financial processor can permit the customer to open the financial account and/or can transmit a validation message to that effect to the computing device. On the other hand, if the computerized financial processor determines that the driver's license is forged (e.g., if the computerized financial processor determines that the customer's face is yawed, pitched, and/or rolled by more than a threshold amount as depicted in the driver's license), the computerized financial processor can refuse to permit the customer to open the financial account and/or can transmit a validation message to the effect to the computing device. In this way, the computerized financial processor can automatically infer whether the customer's driver's license is valid and/or authentic by analyzing the headpose of the customer's face as depicted in the driver's license.

In various embodiments, the computerized tool as described herein can be generalized beyond headpose estimation of depicted faces. That is, in various embodiments, the computerized tool as described herein can be trained and/or configured to detect the pose (e.g., the yaw, pitch, and/or roll) of any suitable object depicted in any suitable electronic document. In some cases, that object can be a face that is depicted in a proof-of-identity document. But, in other cases, that object need not be a face, and the electronic document need not be an electronic version of a proof-of-identity document. Instead, any suitable object that can be depicted in any suitable electronic document can be analyzed as described herein (e.g., the pose of such object can be determined, and the authenticity of the electronic document can be inferred based on the determined pose of the object).

Various embodiments described herein can be employed to use hardware and/or software to solve problems that are highly technical in nature (e.g., to facilitate image forgery detection via headpose estimation), that are not abstract and that cannot be performed as a set of mental acts by a human. Further, some of the processes performed can be performed by a specialized computer (e.g., trained machine learning models such as artificial neural networks) for carrying out defined tasks related to image forgery detection via headpose estimation.

For example, some defined tasks of various embodiments described herein can include: acquiring, by a device operatively coupled to a processor, a scanned image of a proof-of-identity document; recognizing, by the device and via execution of a first trained machine learning model, a face depicted in the scanned image of the proof-of-identity document; estimating, by the device and via execution of a second trained machine learning model, a headpose of the face; classifying, by the device and via execution of a third trained machine learning model, an authenticity of the proof-of-identity document based on the headpose of the face; and in response to classifying the proof-of-identity document as forged, relaying, by the device, a failure message to a computing device.

Such defined tasks are not conventionally performed manually by humans. Indeed, neither the human mind nor a human with pen and paper can electronically retrieve a scanned image of a proof-of-identity document, electronically execute a first trained machine learning model to detect a face depicted in the scanned image of the proof-of-identity document, electronically execute a second trained machine learning model to calculate a headpose of the face, electronically execute a third trained machine learning model to determine an authenticity of the proof-of-identity document based on the calculated headpose, and electronically transmit a failure message in response to a determination that the proof-of-identity document is forged. Instead, various embodiments described herein are inherently and inextricably tied to computer technology and cannot be implemented outside of a computing environment. Specifically, various embodiments can be considered as a computerized tool that utilizes machine learning models to automatically detect a headpose of a face depicted in a proof-of-identity document and to automatically infer whether the document is forged based on the detected headpose. Such a computerized tool cannot be practicably implemented in any sensible way by human beings without computers.

In various instances, embodiments described herein can integrate into a practical application the disclosed teachings regarding image forgery detection via headpose estimation. Indeed, in various embodiments, the disclosed teachings can provide a computerized tool that can automatically evaluate the validity of a proof-of-identity document (e.g., a driver's license, a passport, a visa) based on the headpose of a face depicted in the proof-of-identity document. Specifically, the computerized tool can electronically receive a captured image of the proof-of-identity document. In various cases, the computerized tool can electronically execute a first trained artificial intelligence algorithm, which can be configured to receive as input the captured image of the proof-of-identity document and to produce as output a cropped image of a face depicted in the proof-of-identity document. In various aspects, the computerized tool can electronically execute a second trained artificial intelligence algorithm, which can be configured to receive as input the cropped image of the face and to produce as output a tuple identifying the yaw, roll, and/or pitch of the face. In various instances, the computerized tool can be configured to electronically execute a third trained artificial intelligence algorithm, which can be configured to receive as input the tuple and to produce as output a label identifying the proof-of-identity document as forged or authentic. In various cases, the computerized tool can then take action based on the outputted authenticity label (e.g., can transmit a failure and/or success message based on the label, can permit and/or restrict access to sensitive data based on the label). Such a computerized tool that can automatically evaluate the authenticity of proof-of-identity documents is certainly a useful and/or practical application of computers.

Moreover, in various aspects, embodiments described herein can control real-world and/or tangible devices based on the disclosed teachings. For example, a computerized tool as described herein can electronically evaluate the authenticity of a real-world, tangible proof-of-identity document via headpose estimation, can electronically render successful validation messages and/or unsuccessful validation messages on any suitable computer screen/monitor based on the evaluated authenticity, and/or can grant and/or deny access to protected data based on the evaluated authenticity.

It should be appreciated that the figures described herein are non-limiting examples of various embodiments.

FIG. 1 illustrates a high-level block diagram of an example, non-limiting system 100 that can facilitate image forgery detection via headpose estimation in accordance with one or more embodiments described herein. As shown, an image forgery detection system 102 can be electronically integrated, via any suitable wired and/or wireless electronic connection, with an electronic document 104. In various aspects, the electronic document 104 can be associated with any suitable proof-of-identity document. For instance, the electronic document 104 can be an electronic version and/or an electronic copy of any suitable proof-of-identity document. In various instances, a proof-of-identity document can visually depict a face of a person and/or other entity, which means that the electronic document 104 can likewise visually depict the face of the person and/or other entity. As some non-limiting examples, the electronic document 104 can be a scanned and/or captured image of a driver's license, can be a scanned and/or captured image of a passport, can be a scanned and/or captured image of a passport card, can be a scanned and/or captured image of a visa, can be a scanned and/or captured image of a student identification card, and/or can be a scanned and/or captured image of an employee identification card.

Although the herein discussion mainly describes the electronic document 104 as visually depicting one face, this is a mere non-limiting example. Those having ordinary skill in the art will appreciate that the electronic document 104 can visually depict any suitable number of faces.

As described herein, the image forgery detection system 102 can automatically analyze the electronic document 104 to evaluate an authenticity of the electronic document 104 (e.g., to determine whether the electronic document 104, and thus the proof-of-identity document associated with the electronic document 104, is authentic).

In various embodiments, the image forgery detection system 102 can comprise a processor 106 (e.g., computer processing unit, microprocessor) and a computer-readable memory 108 that is operably coupled to the processor 106. The memory 108 can store computer-executable instructions which, upon execution by the processor 106, can cause the processor 106 and/or other components of the image forgery detection system 102 (e.g., receiver component 110, face detection component 112, headpose component 114, forgery component 116, transmitter component 118) to perform one or more acts. In various embodiments, the memory 108 can store computer-executable components (e.g., receiver component 110, face detection component 112, headpose component 114, forgery component 116, transmitter component 118), and the processor 106 can execute the computer-executable components.

In various embodiments, the image forgery detection system 102 can comprise a receiver component 110. In some cases, the receiver component 110 can electronically retrieve and/or otherwise electronically access the electronic document 104 from any suitable centralized and/or decentralized data structure (not shown), whether remote from and/or local to the receiver component 110. In other cases, the receiver component 110 can electronically receive the electronic document 104 from any suitable computing device (not shown) with which the receiver component 110 can electronically communicate. As some non-limiting examples, the receiver component 110 can receive the electronic document 104 from any suitable laptop computer, desktop computer, and/or smart phone device. In any case, the receiver component 110 can have electronic access to the electronic document 104, such that other components of the image forgery detection system 102 can manipulate, analyze, and/or otherwise interact with the electronic document 104.

In various embodiments, the image forgery detection system 102 can comprise a face detection component 112. In various aspects, the face detection component 112 can electronically analyze the electronic document 104, so as to detect and/or recognize a face (e.g., of a human, animal, and/or otherwise) that is visually depicted in the electronic document 104. In various instances, the face detection component 112 can electronically execute a first trained machine learning model to facilitate such detection and/or recognition of the depicted face. In various cases, the first trained machine learning model can be configured and/or trained (e.g., via any suitable training paradigm) to receive as input the electronic document 104 and to produce as output a cropped image of the face that is visually depicted in the electronic document 104.

In various aspects, the face that is visually depicted in the electronic document 104 can be in some non-upright orientation. For example, if the electronic document 104 is a scanned and/or captured image of a driver's license, it is possible that the image of the driver's license can have been scanned and/or captured when the driver's license was in a non-upright orientation with respect to an image scanning/capturing device (e.g., the image of the driver's license can have been scanned/captured when the driver's license was not aligned with the image scanning/capturing device). This can accordingly cause the face that is visually depicted in the driver's license to be displayed in the electronic document 104 in a corresponding non-upright orientation.

In such cases, the first trained machine learning model can be a progressive calibration network (e.g., a type of artificial neural network) that is trained to receive as input the electronic document 104 and to produce as output a cropped image of the face depicted in the electronic document 104, such that the cropped image of the face is in an upright orientation. More specifically, the progressive calibration network can comprise an ensemble of any suitable number of sub-networks that are serially-coupled. In various aspects, one sub-network in the ensemble can receive the electronic document 104, can detect the face that is visually depicted in the electronic document 104, and can insert a bounding box into the electronic document 104, wherein the bounding box circumscribes the face that is visually depicted in the electronic document 104. In some cases, the bounding box can initially be in an upright orientation. Since the face that is visually depicted in the electronic document 104 can be in a non-upright orientation, the bounding box can be not yet aligned with the face. In various instances, another sub-network in the ensemble can receive the electronic document 104 with the upright bounding box circumscribing the face, and can rotate the bounding box from its current orientation by a first angle of rotation, so that the bounding box is now closer to being aligned with the face (e.g., so that the now-current orientation of the bounding box is closer to the non-upright orientation of the face). In some cases, the first angle of rotation can be any angle up to 180 degrees clockwise and/or 180 degrees counterclockwise. In various aspects, yet another sub-network in the ensemble can receive the electronic document 104 with the once-rotated bounding box circumscribing the face, and can rotate the bounding box from its current orientation by a second angle of rotation that is finer (e.g., smaller in maximum absolute magnitude) than the first angle of rotation, so that the bounding box is now even closer to being aligned with the face (e.g., so that the now-current orientation of the bounding box is even closer to the non-upright orientation of the face). In some cases, the second angle of rotation can be any angle up to 90 degrees clockwise and/or 90 degrees counterclockwise. In this fashion, the ensemble can include any suitable number of additional sub-networks which can be configured to rotate the bounding box by progressively finer angles of rotation, until the bounding box is aligned with the face (e.g., until the current orientation of the bounding box is within any suitable threshold margin of the non-upright orientation of the face). Accordingly, the progressive calibration network can output the bounding box as aligned with the face.

In some cases, the progressive calibration network can be considered as cropping out the portions of the electronic document 104 that are not encompassed within the bounding box, thereby leaving only the portion of the electronic document 104 that is encompassed within the bounding box (e.g., thereby leaving the face). In various aspects, the progressive calibration network can output the aligned bounding box in an upright orientation, while maintaining the relative positional relationship between the bounding box and the face. In other words, the progressive calibration network can output the aligned bounding box so that the face is now depicted in an upright orientation. In various cases, the outputted bounding box as aligned with the face can be considered as the cropped image of the face.

Although the herein disclosure mainly describes the progressive calibration network as outputting the aligned bounding box, and thus the face, in an upright orientation, this is a mere non-limiting example. In various embodiments, the progressive calibration network can be configured to output the aligned bounding box, and thus the face, in any suitable standardized orientation, whether or not that standardized orientation is upright. In some cases, the progressive calibration network can be configured to output the aligned bounding box so that it is in the original non-upright orientation of the face.

In various embodiments, the image forgery detection system 102 can comprise a headpose component 114. In various aspects, the headpose component 114 can electronically analyze the cropped image of the face, so as to estimate, calculate, and/or compute a headpose of the depicted face. As those having ordinary skill in the art will appreciate, the headpose of a face can be defined by three angles: a yaw angle, a roll angle, and/or a pitch angle. In various aspects, a yaw angle of a depicted face and/or head can be an angle of rotation about an axis that runs from the top of the depicted face and/or head to the bottom of the depicted face and/or head. In various instances, a roll angle of a depicted face and/or head can be an angle of rotation about an axis that runs from the front of the depicted face and/or head to the back of the depicted face and/or head. In various cases, a pitch angle of a depicted face and/or head can be an angle of rotation about an axis that runs from a right side of the depicted face and/or head to a left side of the depicted face and/or head. In various instances, the headpose component 114 can electronically execute a second trained machine learning model to facilitate such estimation, calculation, and/or computation of the headpose of the depicted face. In various cases, the second trained machine learning model can be configured and/or trained (e.g., via any suitable training paradigm) to receive as input the cropped image of the face and to produce as output three scalars that collectively represent the headpose of the face: one scalar representing a yaw angle, one scalar representing a roll angle, and/or one scalar representing a pitch angle.

In various embodiments, the image forgery detection system 102 can comprise a forgery component 116. In various aspects, the forgery component 116 can electronically analyze the headpose of the face as determined by the headpose component 114, so as to infer and/or characterize an authenticity of the electronic document 104 (e.g., an authenticity of the proof-of-identity document associated with the electronic document 104). In various cases, an authentic proof-of-identity document (e.g., an authentic driver's license, an authentic passport, an authentic visa) can be created so as to conform to standardized rules regarding headpose. For example, an authentic proof-of-identity document can be created so that a face depicted in the proof-of-identity document is not yawed left or right by more than a threshold margin, is not rolled left or right by more than a threshold margin, and/or is not pitched up or down by more than a threshold margin. In stark contrast, a forged proof-of-identity document, which can be created via copy and/or paste operations facilitated by photo-editing software, can depict a face that is yawed left or right by more than a threshold margin, rolled left or right by more than a threshold margin, and/or pitched up or down by more than a threshold margin. Accordingly, in various cases, the headpose of a face depicted in the electronic document 104 can be used to infer whether the electronic document 104 (e.g., whether the proof-of-identity document associated with the electronic document 104) is authentic or forged. In various instances, the forgery component 116 can electronically execute a third trained machine learning model to facilitate such inference and/or characterization of the authenticity of the electronic document 104. In various cases, the third trained machine learning model can be configured and/or trained (e.g., via any suitable training paradigm) to receive as input the three scalars defining the headpose of the depicted face as determined by the headpose component 114 and to produce as output a label that classifies an authenticity of the electronic document 104 (e.g., that labels the proof-of-identity document associated with the electronic document 104 as either authentic or forged).

In various embodiments, the image forgery detection system 102 can comprise a transmitter component 118. In various aspects, the transmitter component 118 can electronically generate a successful and/or unsuccessful validation message based on the authenticity determination generated by the forgery component 116. For example, if the forgery component 116 determines and/or infers that the electronic document 104 is forged, the transmitter component 118 can generate an unsuccessful validation message and/or alert. On the other hand, if the forgery component 116 determines and/or infers that the electronic document 104 is authentic, the transmitter component 118 can generate a successful validation message and/or alert. In various cases, the transmitter component 118 can electronically transmit such validation messages and/or alerts to any suitable computing device (not shown).

Figure 2:
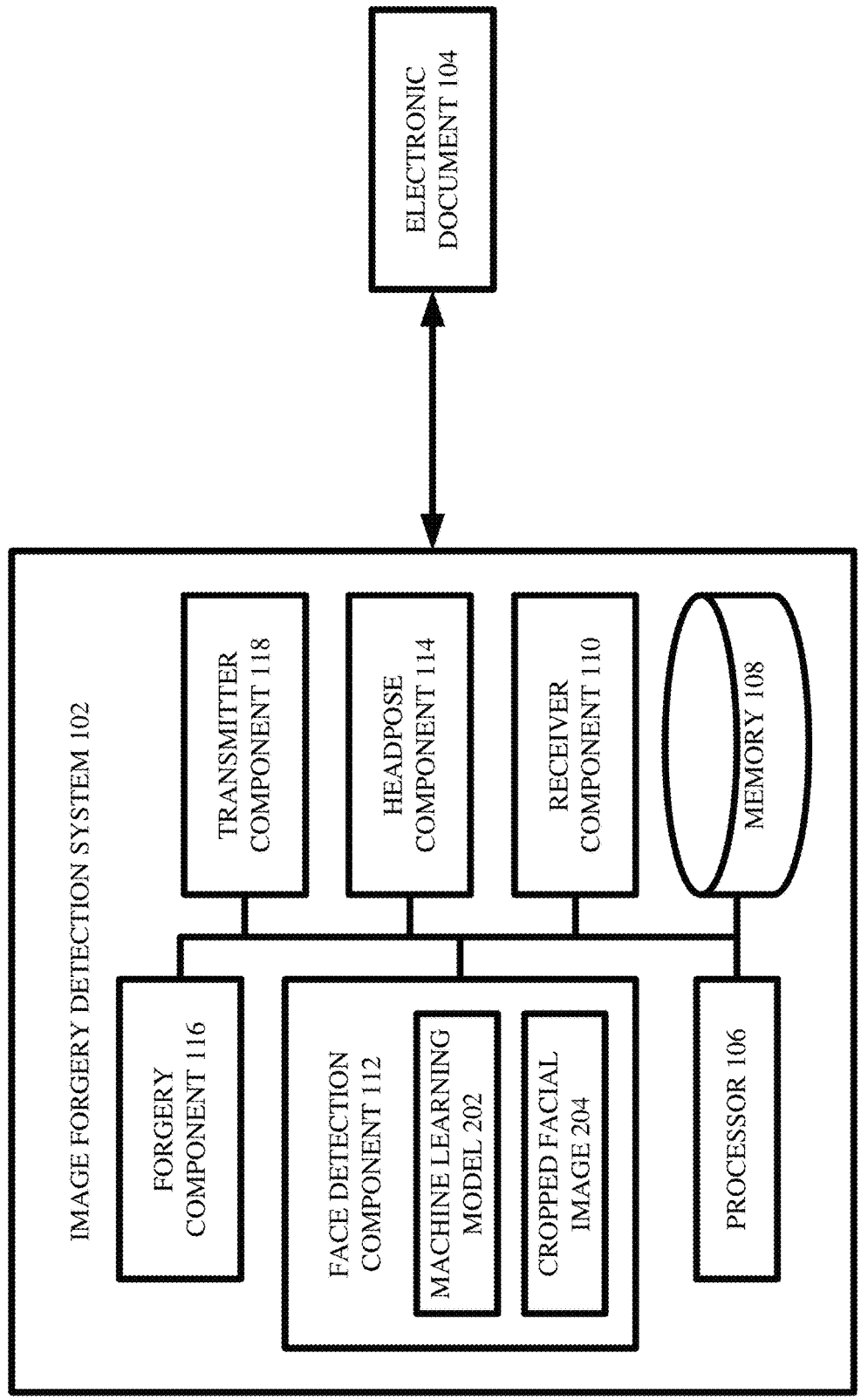
FIG. 2 illustrates a high-level block diagram of an example, non-limiting system including a machine learning model and a cropped facial image that facilitates image forgery detection via headpose estimation in accordance with one or more embodiments described herein.

FIG. 2 illustrates a high-level block diagram of an example, non-limiting system 200 including a machine learning model and a cropped facial image that can facilitate image forgery detection via headpose estimation in accordance with one or more embodiments described herein. As shown, the system 200 can, in some cases, comprise the same components as the system 100, and can further comprise a machine learning model 202 and a cropped facial image 204.

In various embodiments, the face detection component 112 can comprise the machine learning model 202. In various aspects, the machine learning model 202 can exhibit any suitable artificial intelligence architecture. For example, the machine learning model 202 can be an artificial neural network (e.g., a deep learning model) that can comprise any suitable number of neural network layers, any suitable number of neurons in various neural network layers, any suitable types of activation functions (e.g., sigmoid, softmax, hyperbolic tangent), and/or any suitable inter-neuron connectivity patterns (e.g., fully connected, recursive connections, skip connections). In other non-limiting examples, the machine learning model 202 can be a support vector machine, a logistic regression model, and/or a naïve Bayes model.

In various aspects, the machine learning model 202 can be configured, structured, and/or trained (e.g., via supervised training, unsupervised training, and/or reinforcement learning) to receive as electronic input the electronic document 104 and to generate as electronic output the cropped facial image 204. As explained above, the electronic document 104 can be an electronic copy and/or an electronic version of a proof-of-identity document, which means that the electronic document 104 can visually depict a face (e.g., the electronic document 104 can be a scanned and/or captured image of the proof-of-identity document). In various cases, the machine learning model 202 can be configured, structured, and/or trained so as to crop out irrelevant and/or background portions of the electronic document 104 and so as to return the portion of the electronic document 104 that depicts the face. This returned portion of the electronic document 104 can be considered as the cropped facial image 204. In other words, the machine learning model 202 can receive as input a pixel-matrix representing the electronic document 104 and can generate as output a smaller pixel-matrix representing the pixels of the electronic document 104 that depict the face. This smaller pixel-matrix can be considered as the cropped facial image 204.

As mentioned above, it can be the case that the electronic document 104 depicts the face in a non-upright orientation. In various cases, the machine learning model 202 can be a progressive calibration network which can detect the face in the electronic document 104 and which can output the cropped facial image 204 such that the cropped facial image 204 is in an upright orientation. This is more clearly shown with respect to FIG. 3.

Figure 3:
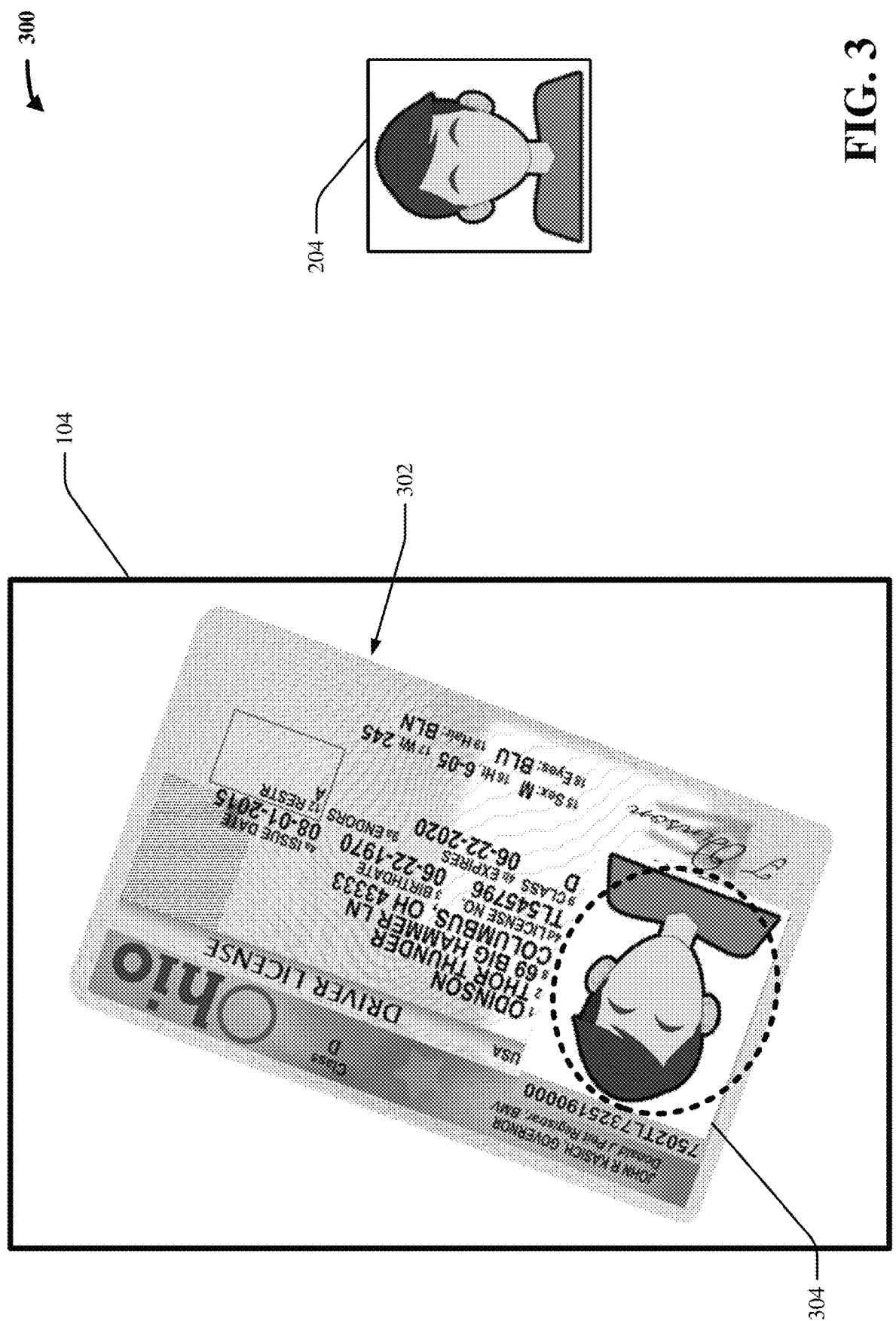
FIG. 3 illustrates example, non-limiting images of an electronic document and a cropped facial image in accordance with one or more embodiments described herein.

FIG. 3 illustrates example, non-limiting images of an electronic document and a cropped facial image in accordance with one or more embodiments described herein. In other words, FIG. 3 depicts a non-limiting example of the electronic document 104 and a non-limiting example of the cropped facial image 204.

As shown, the electronic document 104 can, in some cases, be a scanned image of a proof-of-identity document 302. In the non-limiting example shown in FIG. 3, the proof-of-identity document 302 can be a driver's license. In various instances, an image scanning/capturing device (not shown) can be implemented to capture and/or scan an image of the proof-of-identity document 302, thereby yielding the electronic document 104. In various aspects, as shown, the proof-of-identity document 302 can include a face 304. Accordingly, the electronic document 104 can visually depict the face 304 of the proof-of-identity document 302.

As shown, it can be the case that the proof-of-identity document 302, and thus the face 304, is not depicted in an upright orientation within the electronic document 104. In various aspects, this can be caused by the proof-of-identity document 302 not being aligned (e.g., not being parallel and/or perpendicular) with the optical field of the image scanning/capturing device when the image scanning/capturing device creates the electronic document 104 (e.g., when the image scanning/capturing device scans/captures an image of the proof-of-identity document 302). In various embodiments, the machine learning model 202 can receive as input the electronic document 104 and can produce as output the cropped facial image 204. As shown, the cropped facial image 204 can be in an upright orientation, notwithstanding that the face 304 can be depicted in the electronic document 104 in a non-upright orientation.

In various aspects, to facilitate such functionality, the machine learning model 202 can be a progressive calibration network. In various instances, the progressive calibration network can be an ensemble of any suitable number of sub-neural-networks connected in series with each other. In various cases, one of the sub-neural-networks can be configured (e.g., having any suitable neural network architecture) to receive the electronic document 104, to detect the location of the face 304 within the electronic document 104, and to superimpose a bounding box over the electronic document 104, such that the bounding box circumscribes the face 304. In various instances, the bounding box can initially be in an upright orientation, which means that the bounding box can initially be not aligned with the face 304.

In various aspects, another sub-neural-network of the ensemble can be configured (e.g., having any suitable neural network architecture) to receive the electronic document 104 with the superimposed and upright bounding box, and can rotate (and/or refrain from rotating) the bounding box from its upright position by some first rotation angle. In various cases, the result can be that the new orientation of the bounding box is now closer to the non-upright orientation of the face 304. In various instances, the first rotation angle can be 180 degrees (e.g., can be a coarse rotation angle).

In various aspects, yet another sub-neural-network of the ensemble can be configured (e.g., having any suitable neural network architecture) to receive the electronic document 104 with the superimposed and once-rotated bounding box, and can rotate (and/or refrain from rotating) the bounding box from its current orientation by some second rotation angle that is finer than the first rotation angle. In various cases, the result can be that the new orientation of the bounding box is now even closer to the non-upright orientation of the face 304. In various instances, the second rotation angle can be 90 degrees clockwise and/or 90 degrees counterclockwise (e.g., a 90-degree rotation is less coarse than a 180-degree rotation).

In various aspects, still another sub-neural-network of the ensemble can be configured (e.g., having any suitable neural network architecture) to receive the electronic document 104 with the superimposed and twice-rotated bounding box, and can rotate (and/or refrain from rotating) the bounding box from its current orientation by some third rotation angle that is finer than the second rotation angle. In various instances, the result can be that the new orientation of the bounding box is even closer to the non-upright orientation of the face 304. In various cases, the third rotation angle can be 45 degrees clockwise and/or 45 degrees counterclockwise (e.g., a 45-degree rotation is less coarse than a 90-degree rotation).

In this way, the progressive calibration network can include any suitable number of sub-neural-networks, such that a given sub-neural-network is configured and/or trained to receive the bounding box produced by the previous sub-neural-network and to rotate the bounding box so that an angular difference between the resulting orientation of the bounding box and the non-upright orientation of the face 304 is reduced. Once the final sub-neural-network rotates the bounding box by some finest rotation angle such that an angular difference between the orientation of the bounding box and the non-upright orientation of the face 304 is below any suitable threshold margin, the bounding box can be considered as being aligned with the face 304. Accordingly, the progressive calibration network can output the bounding box as aligned with the face 304, and can delete and/or crop out portions of the electronic document 104 that are not circumscribed by the bounding box. As mentioned above, once aligned, the bounding box and the face 304 can together be considered as the cropped facial image 204.

In various cases, now that the bounding box and the face 304 are aligned, they can be rotated together (e.g., while maintaining their relative orientations with respect to each other) until they are both in an upright orientation. As shown in FIG. 3, the result can be that the cropped facial image 204 is depicted in an upright orientation, notwithstanding that the face 304 is depicted in the electronic document 104 as having a non-upright orientation.

Figure 4:
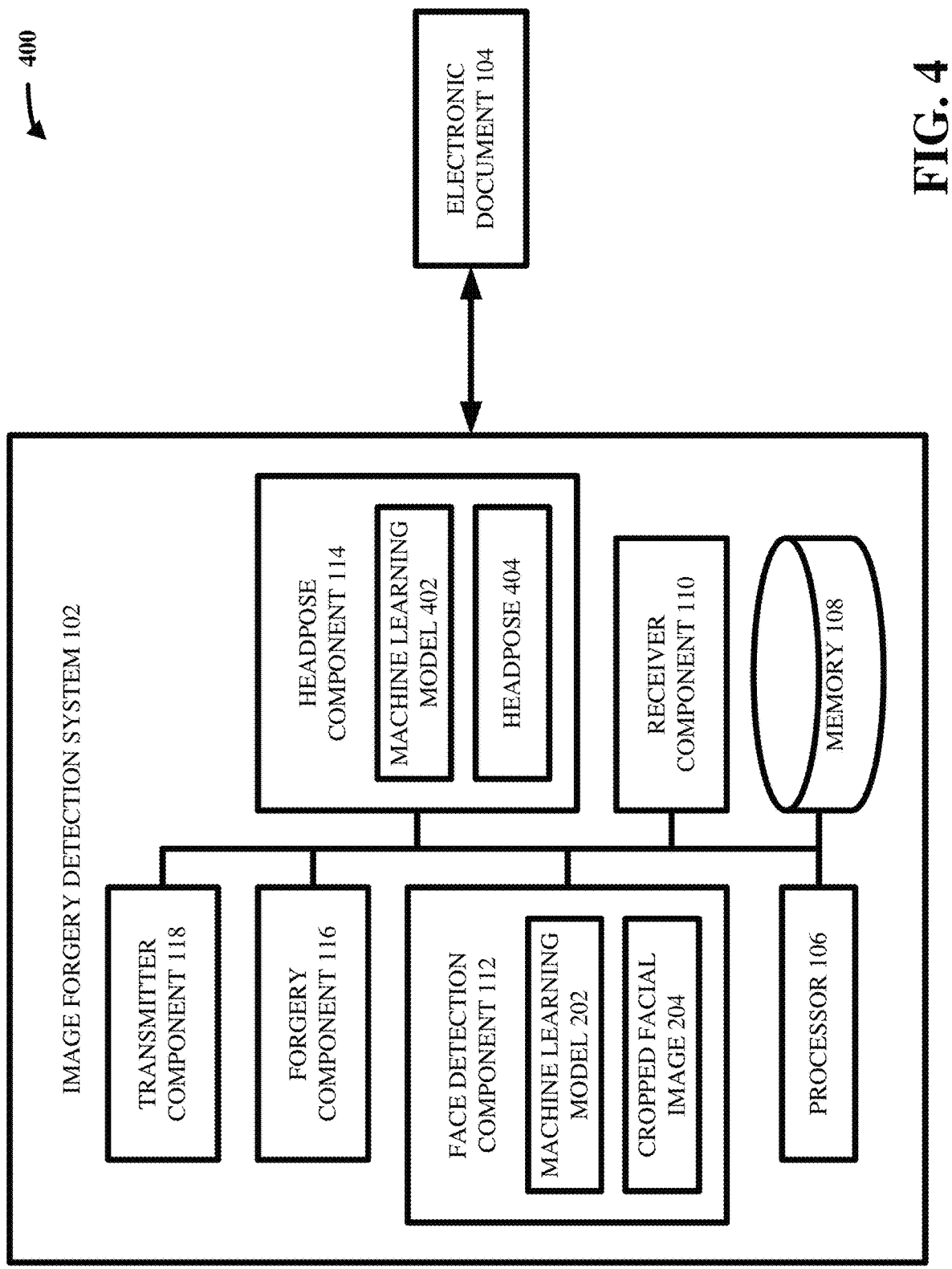
FIG. 4 illustrates a high-level block diagram of an example, non-limiting system including a machine learning model and a headpose that facilitates image forgery detection via headpose estimation in accordance with one or more embodiments described herein.

FIG. 4 illustrates a high-level block diagram of an example, non-limiting system 400 including a machine learning model and a headpose that can facilitate image forgery detection via headpose estimation in accordance with one or more embodiments described herein. As shown, the system 400 can, in some cases, comprise the same components as the system 200, and can further comprise a machine learning model 402 and a headpose 404.

In various embodiments, the headpose component 114 can comprise the machine learning model 402. In various aspects, the machine learning model 402 can exhibit any suitable artificial intelligence architecture. For example, the machine learning model 402 can be an artificial neural network (e.g., a deep learning model) that can comprise any suitable number of neural network layers, any suitable number of neurons in various neural network layers, any suitable types of activation functions (e.g., sigmoid, softmax, hyperbolic tangent), and/or any suitable inter-neuron connectivity patterns (e.g., fully connected, recursive connections, skip connections). In other non-limiting examples, the machine learning model 402 can be a support vector machine, a logistic regression model, and/or a naïve Bayes model.

In various aspects, the machine learning model 402 can be configured, structured, and/or trained (e.g., via supervised training, unsupervised training, and/or reinforcement learning) to receive as electronic input the cropped facial image 204 and to generate as electronic output the headpose 404.

As explained above, the headpose of a face and/or head can be defined by three separate angular measurements: a yaw angle, a roll angle, and/or a pitch angle. In various instances, a yaw angle of a face/head can be an angle of rotation about an axis, which axis extends from the top (e.g., scalp) of the face/head to the bottom (e.g., neck) of the face/head. In various aspects, a roll angle of a face/head can be an angle of rotation about an axis, which axis extends from the front (e.g., anterior) of the face/head to the back (e.g., posterior) of the face/head. In various cases, a pitch angle of a face/head can be an angle of rotation about an axis, which axis extends from one lateral side (e.g., left side) of the face/head to the other lateral side (e.g., right side) of the face/head. This is more clearly shown in FIG. 5.

Figure 5:
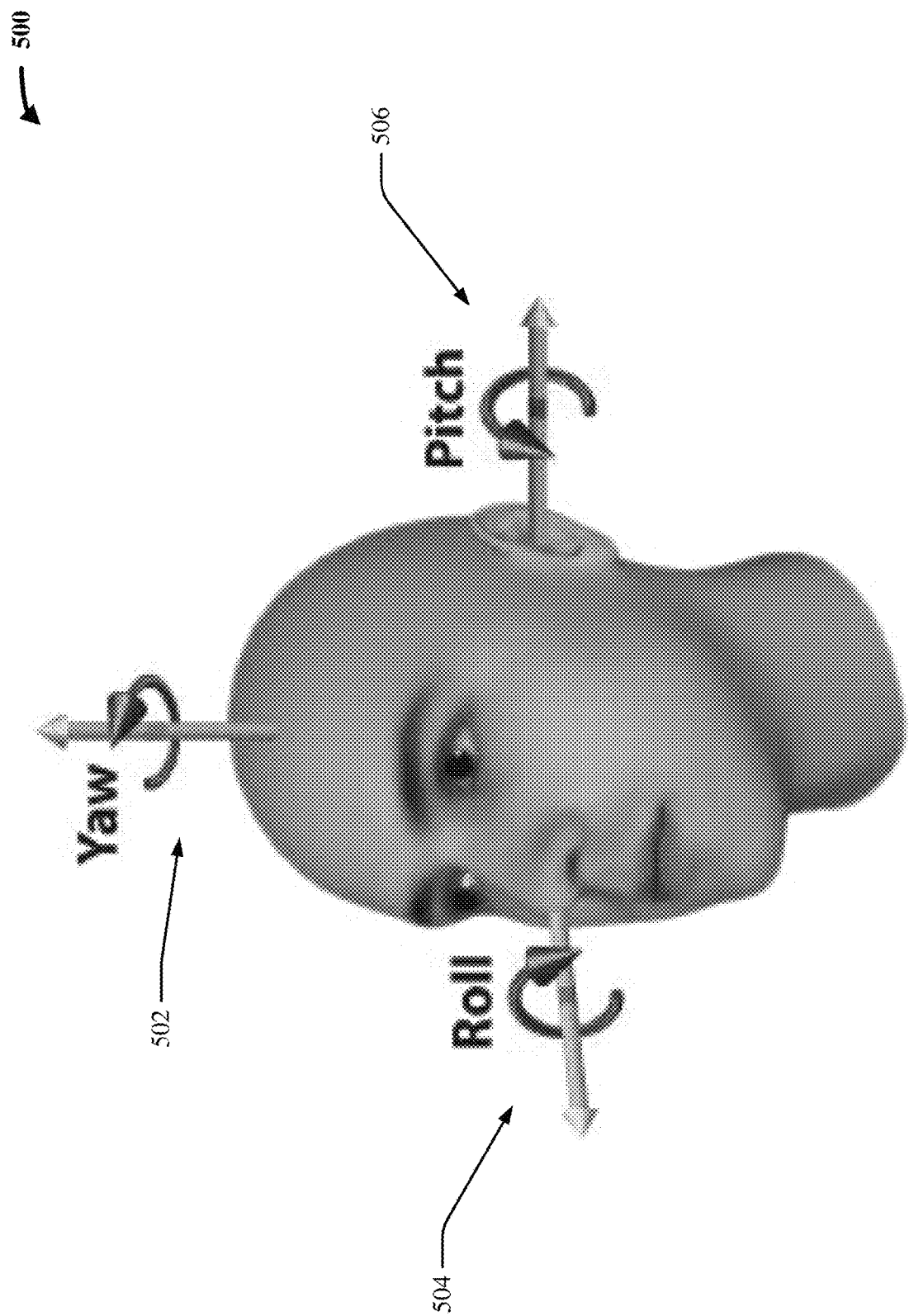
FIG. 5 illustrates example, non-limiting yaw, roll, and/or pitch which can define a headpose in accordance with one or more embodiments described herein.

FIG. 5 illustrates example, non-limiting yaw, roll, and/or pitch which can define a headpose in accordance with one or more embodiments described herein. In other words, FIG. 5 illustrates how the yaw, roll, and/or pitch of a face/head can be measured. Specifically, the reference numeral 502 calls out a yaw angle of rotation about an axis that runs from the top of a face/head to the bottom of the face/head (e.g., yaw axis can extend from top of head to bottom of head). Moreover, the reference numeral 504 calls out a roll angle of rotation about an axis that runs from an anterior portion of the face/head to a posterior portion of the face/head (e.g., roll axis can extend from nose to back of head). Furthermore, the reference numeral 506 calls out a pitch angle of rotation about an axis that runs from one lateral side of the head to another lateral side of the head (e.g., pitch axis can extend from ear to ear).

In various aspects, the yaw, roll, and/or pitch of the face depicted in the cropped facial image 204 can together be considered as the headpose 404. More specifically, the headpose 404 can be a tuple of values that indicate the yaw, roll, and/or pitch of the face depicted in the cropped facial image 204. In other cases, the headpose 404 can, in various embodiments, be any suitable combination of scalars, vectors, matrices, tensors, and/or strings which collectively indicate the yaw angle, the roll angle, and/or the pitch angle of the face depicted in the cropped facial image 204. In various cases, the machine learning model 402 can be configured, structured, and/or trained so as to estimate and/or calculate the yaw angle, the roll angle, and/or the pitch angle of the face depicted in the cropped facial image 204. That is, the machine learning model 402 can receive as input a pixel-matrix representing the cropped facial image 204 and can generate as output any suitable combination of one or more scalars, one or more vectors, one or more matrices, one or more tensors, and/or one or more strings. In various aspects, some of such output can indicate the magnitude and/or direction of the yaw angle of rotation of the face depicted in the cropped facial image 204 as measured from any suitable datum. In various instances, other of such output can indicate the magnitude and/or direction of the roll angle of rotation of the face depicted in the cropped facial image 204 as measured from any suitable datum. In various cases, still other of such output can indicate the magnitude and/or direction of the pitch angle of rotation of the face depicted in the cropped facial image 204 as measured from any suitable datum. In any case, the output of the machine learning model 402 (e.g., the headpose 404) can indicate in any suitable fashion the yaw, roll, and/or pitch of the face that is depicted in the cropped facial image 204.

In some cases, the machine learning model 402 can be configured so as to identify facial landmarks in the face depicted in the cropped facial image 204 (e.g., nose, eyes, ears, chin, cheeks). In various cases, once such facial landmarks are localized and/or identified, the machine learning model 402 can be configured to estimate the headpose 404 by utilizing any suitable OpenCV matrix transformations, so as to obtain the yaw, roll, and/or pitch angles of the depicted face.

Figure 6:
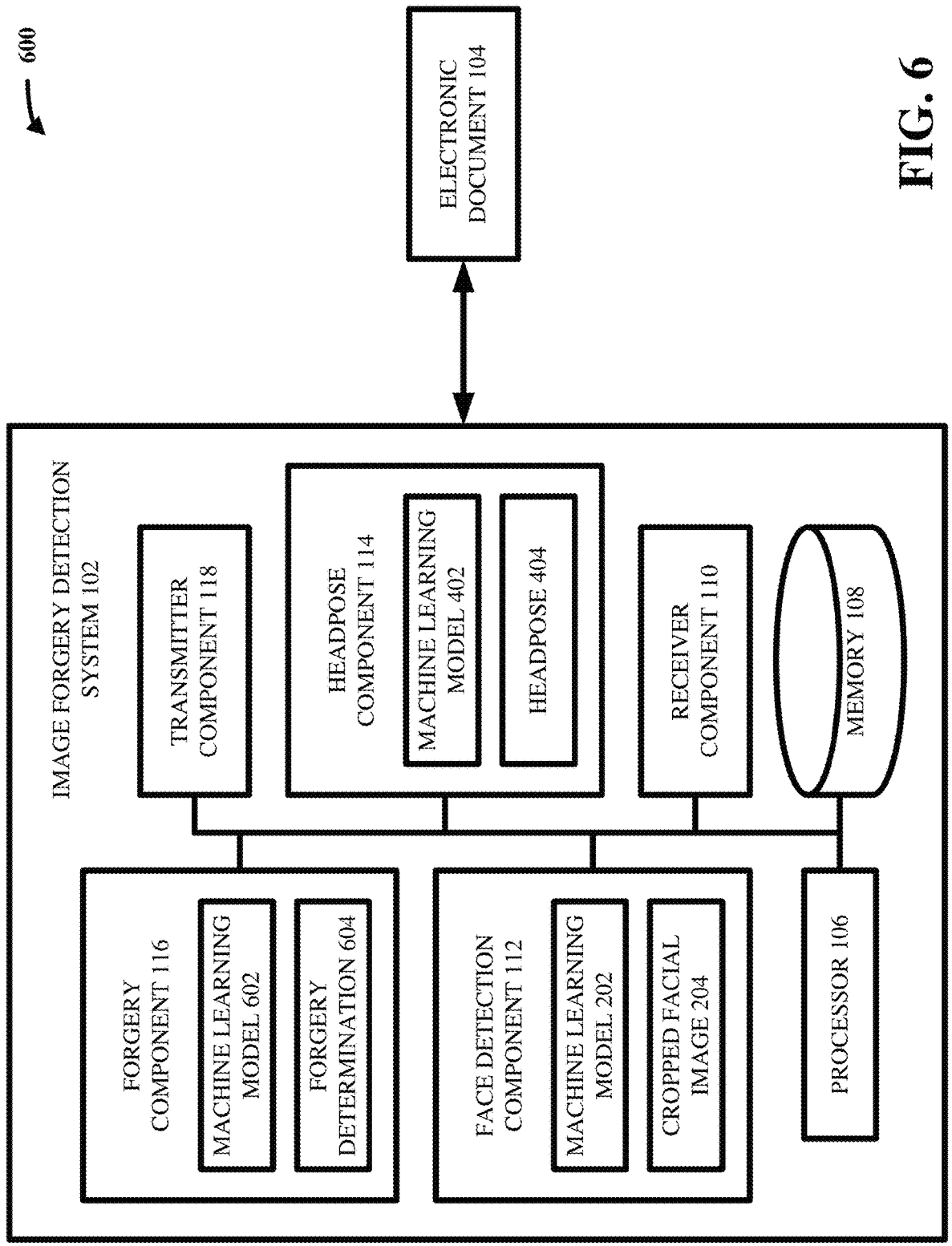
FIG. 6 illustrates a high-level block diagram of an example, non-limiting system including a machine learning model and a forgery determination that facilitates image forgery detection via headpose estimation in accordance with one or more embodiments described herein.

FIG. 6 illustrates a high-level block diagram of an example, non-limiting system 600 including a machine learning model and a forgery determination that can facilitate image forgery detection via headpose estimation in accordance with one or more embodiments described herein. As shown, the system 600 can, in some cases, comprise the same components as the system 400, and can further comprise a machine learning model 602 and/or a forgery determination 604.

In various embodiments, the forgery component 116 can comprise the machine learning model 602. In various aspects, the machine learning model 602 can exhibit any suitable artificial intelligence architecture. For example, the machine learning model 602 can be an artificial neural network (e.g., a deep learning model) that can comprise any suitable number of neural network layers, any suitable numbers of neurons in various neural network layers, any suitable types of activation functions (e.g., sigmoid, softmax, hyperbolic tangent), and/or any suitable inter-neuron connectivity patterns (e.g., fully connected, recursive connections, skip connections). In other non-limiting examples, the machine learning model 602 can be a support vector machine, a logistic regression model, and/or a naïve Bayes model.

In various aspects, the machine learning model 602 can be configured, structured, and/or trained (e.g., via supervised training, unsupervised training, and/or reinforcement learning) to receive as electronic input the headpose 404 and to generate as electronic output the forgery determination 604.

As explained above, an authentic proof-of-identity document can depict a face according to a standardize headpose.

In various aspects, such a standardized headpose can be defined by the lack of a threshold amount of yawing (e.g., the presence of a small yaw angle of rotation), the lack of a threshold amount of rolling (e.g., the presence of a small roll angle of rotation), and/or the lack of a threshold amount of pitching (e.g., the presence of a small pitch angle of rotation). In contrast, a forged proof-of-identity document can depict a face that does not comply with such a standardized headpose. For example, a forged proof-of-identity document can depict a face that exceeds a threshold amount of yawing (e.g., the presence of a large yaw angle of rotation), exceeds a threshold amount of rolling (e.g., the presence of a large roll angle of rotation), and/or exceeds a threshold amount of pitching (e.g., the presence of a large pitch angle of rotation). Accordingly, in various cases, headpose can be used as a defining feature to distinguish between authentic proof-of-identity documents and forged proof-of-identity documents. Thus, in various aspects, the machine learning model 602 can be trained to classify and/or label a headpose (e.g., a yaw-roll-pitch tuple) as corresponding to an authentic proof-of-identity document or as corresponding to a forged proof-of-identity document. So, the machine learning model 602 can receive as input the headpose 404 and produce as output a classification and/or label that indicates the authenticity of the electronic document 104 (e.g., of the proof-of-identity document associated with the electronic document 104). Such classification and/or label can be considered as the forgery determination 604.

In some embodiments, the forgery component 116 can lack the machine learning model 602. In such cases, the forgery component 116 can compare the yaw, roll, and/or pitch indicated by the headpose 404 to any suitable yaw thresholds, roll thresholds, and/or pitch thresholds. If the forgery component 116 determines that the headpose 404 satisfies and/or otherwise complies with such yaw thresholds, roll thresholds, and/or pitch thresholds, the forgery component 116 can infer that the electronic document 104 is authentic. On the other hand, if the forgery component 116 determines that the headpose 404 fails to satisfy and/or otherwise comply with such yaw thresholds, roll thresholds, and/or pitch thresholds, the forgery component 116 can infer that the electronic document 104 is forged. In any case, the forgery component 116 can generate the forgery determination 604 based on the headpose 404, such that the forgery determination 604 characterizes an authenticity of the electronic document 104.

FIG. 7 illustrates example, non-limiting images of an authentic headpose and a forged headpose in accordance with one or more embodiments described herein. In other words, FIG. 7 depicts a non-limiting example of a headpose corresponding to an authentic proof-of-identity document, as well as a non-limiting example of a headpose corresponding to a forged proof-of-identity document.

As shown, FIG. 7 includes an authentic headpose 702 and a forged headpose 704. As can be seen, the authentic headpose 702 depicts a face that is substantially viewed from a straight-on perspective. That is, the face of the authentic headpose 702 is not yawed left or right by more than a threshold margin, is not rolled left or right by more than a threshold margin, and is not pitched up or down by more than a threshold margin. Accordingly, the yaw, roll, and/or pitch of the authentic headpose 702 can be small in magnitude, and the machine learning model 602 can determine that such small yaw, roll, and/or pitch magnitudes correspond to an authentic proof-of-identity document. On the other hand, and as can be seen, the forged headpose 704 does not depict a face that is substantially viewed from a straight-on perspective. As shown, although the face of the forged headpose 704 does not appear to be rolled to its left and/or right by more than a threshold margin, it does appear to be pitched downward by more than a threshold margin and to be yawed to its right (e.g., to a reader's/viewer's left) by more than a threshold margin. Accordingly, the yaw and/or pitch of the forged headpose 704 can be large in magnitude, and the machine learning model 602 can determine that such large yaw and/or pitch magnitudes correspond to a forged proof-of-identity document.

In various embodiments, as mentioned above, the transmitter component 118 can electronically generate and/or transmit any suitable validation messages, warnings, and/or alerts, based on the forgery determination 604. For example, if the forgery determination 604 indicates that the electronic document 104 is forged, the transmitter component 118 can generate and/or transmit a validation failure message. On the other hand, if the forgery determination 604 indicates that the electronic document 104 is authentic, the transmitter component 118 can generate and/or transmit a validation success message. In some cases, the transmitter component 118 can transmit and/or refrain from transmitting sensitive data to any suitable computing device (not shown), based on the forgery determination 604. For example, if the forgery determination 604 indicates that the electronic document 104 is forged, the transmitter component 118 can refrain from transmitting secured and/or encrypted data to the computing device. On the other hand, if the forgery determination 604 indicates that the electronic document 104 is authentic, the transmitter component 118 can transmit the secured and/or encrypted data to the computing device. In various aspects, the transmitter component 118 can take any other suitable form of electronic action based on the forgery determination 604.

Figure 8:
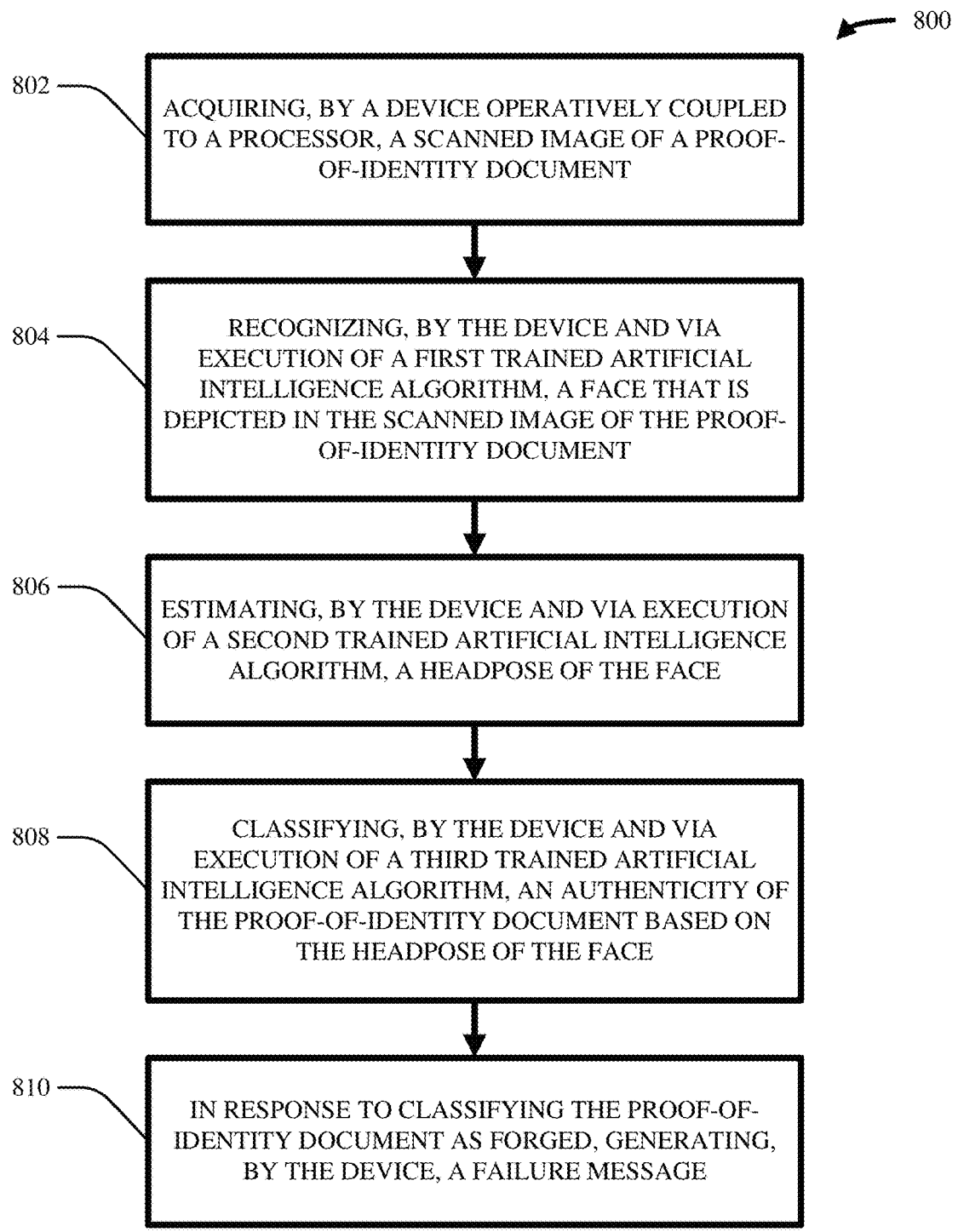
FIG. 8 illustrates a flow diagram of an example, non-limiting computer-implemented method that facilitates image forgery detection via headpose estimation in accordance with one or more embodiments described herein.

FIG. 8 illustrates a flow diagram of an example, non-limiting computer-implemented method 800 that can facilitate image forgery detection via headpose estimation in accordance with one or more embodiments described herein. In various cases, the computer-implemented method 800 can be facilitated by the image forgery detection system 102.

In various embodiments, act 802 can include acquiring, by a device (e.g., 110) operatively coupled to a processor, a scanned image (e.g., 104) of a proof-of-identity document.

In various aspects, act 804 can include recognizing, by the device (e.g., 112) and via execution of a first trained artificial intelligence algorithm (e.g., 202), a face (e.g., 302) that is depicted in the scanned image of the proof-of-identity document.

In various instances, act 806 can include estimating, by the device (e.g., 114) and via execution of a second trained artificial intelligence algorithm (e.g., 402), a headpose (e.g., 404) of the face.

In various cases, act 808 can include classifying, by the device (e.g., 116) and via execution of a third trained artificial intelligence algorithm (e.g., 602), an authenticity of the proof-of-identity document based on the headpose of the face.

In various aspects, act 810 can include, in response to classifying the proof-of-identity document as forged, generating, by the device (e.g., 118), a failure message.

Although not explicitly shown in FIG. 8, it can be the case that the first trained artificial intelligence algorithm receives as input the scanned image of the proof-of-identity document and produces as output a cropped image (e.g., 204) of the face.

Although not explicitly shown in FIG. 8, it can be the case that the face is depicted in the scanned image of the proof-of-identity document in a non-upright orientation. In various aspects, the first trained artificial intelligence algorithm can be a progressive calibration network that can align a bounding box with the face via a sequence of progressively finer rotations. In various instances, the cropped image of the face can be in an upright orientation that corresponds to the bounding box once the bounding box has been aligned with the face.

Although not explicitly shown in FIG. 8, it can be the case that the progressive calibration network is an ensemble of sub-networks.

Although not explicitly shown in FIG. 8, it can be the case that the second trained artificial intelligence algorithm receives as input the cropped image of the face and produces as output a yaw angle, a roll angle, and a pitch angle that collectively define the headpose of the face.

As explained herein, in various embodiments, the electronic document 104 can depict a face, and the image forgery detection system 102 can be configured to receive the electronic document 104, to crop the face depicted in the electronic document 104, to estimate the headpose of the face depicted in the electronic document 104, and/or to infer the authenticity of the electronic document 104 based on the estimated headpose. Those having ordinary skill in the art will understand that this is a mere non-limiting example of various embodiments of the image forgery detection system 102. Those having ordinary skill in the art will further understand that, in various embodiments, the image forgery detection system 102 can be generalized to calculate the pose of any suitable object depicted in the electronic document 104 and/or to infer the authenticity of the electronic document 104 based on the calculated pose.

Indeed, in various aspects, the electronic document 104 can depict some object (e.g., can depict a face, can depict any other suitable anatomical structure, can depict any suitable inanimate object and/or structure). In such cases, the face detection component 112 can be considered as a generalized object detection component, and the headpose component 114 can be considered as a generalized pose component. In various instances, the receiver component 110 can electronically access the electronic document 104, just as above. In such cases, the generalized object detection component can execute any suitable trained machine learning model that is configured to receive the electronic document 104, to detect the object depicted in the electronic document 104, and/or to output a cropped image of the object. In various aspects, the generalized pose component can execute any suitable trained machine learning model that is configured to receive the cropped image of the object, and to output a yaw angle, a roll angle, and/or a pitch angle that collectively define a pose of the object. In various instances, the forgery component 116 can classify an authenticity of the electronic document 104, based on the pose of the object computed by the generalized pose component. Finally, the transmitter component 118 can generate and/or transmit alerts/warnings, based on the authenticity determination produced by the forgery component 116. Such functionality is further explained with respect to FIG. 9.

Figure 9:
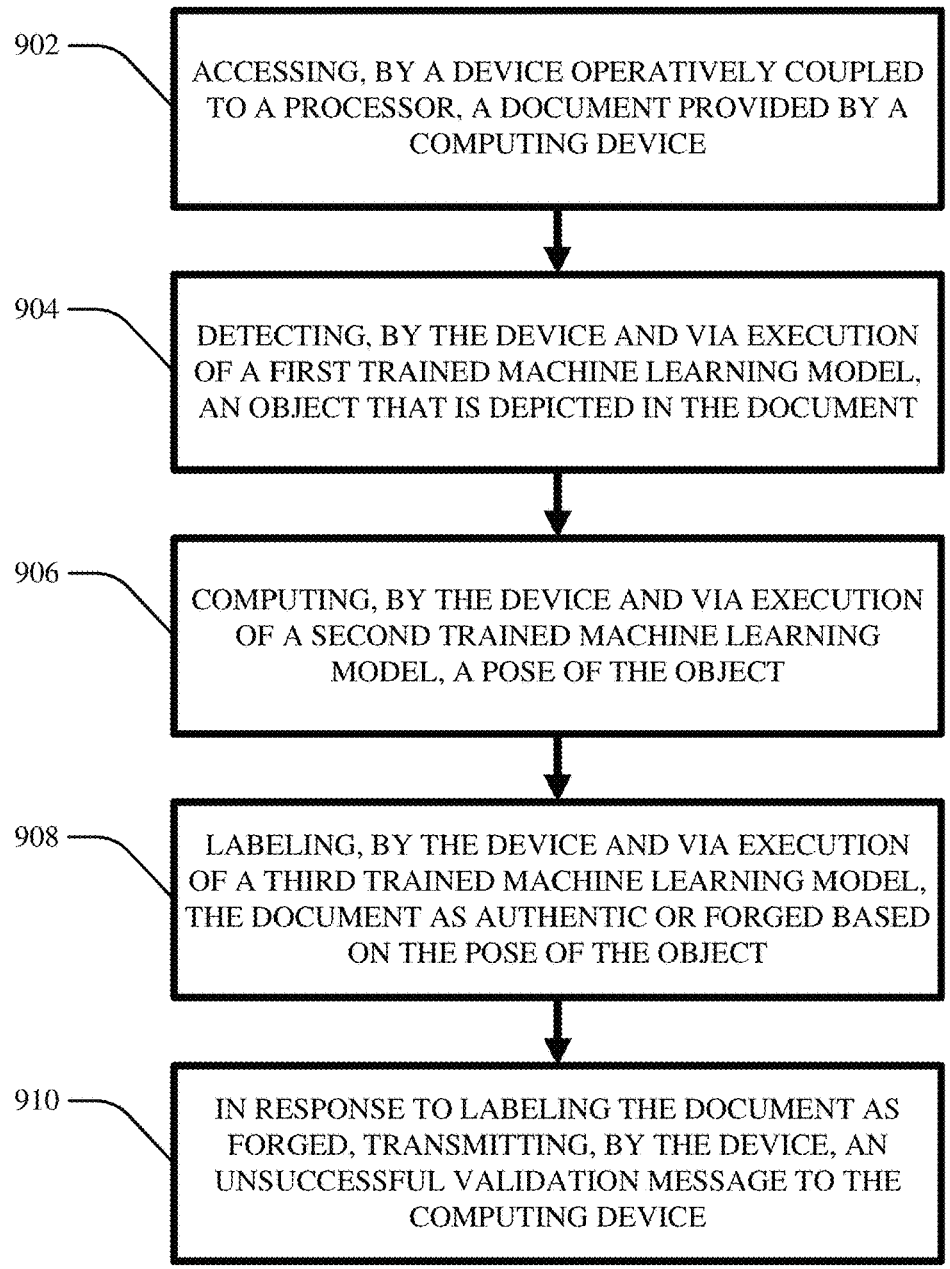
FIG. 9 illustrates a flow diagram of an example, non-limiting computer-implemented method that facilitates image forgery detection via generalized object pose estimation in accordance with one or more embodiments described herein.

FIG. 9 illustrates a flow diagram of an example, non-limiting computer-implemented method 900 that can facilitate image forgery detection via generalized object pose estimation in accordance with one or more embodiments described herein.

In various embodiments, act 902 can comprise accessing, by a device (e.g., 110) operatively coupled to a processor, a document (e.g., 104) provided by a computing device.

In various aspects, act 904 can include detecting, by the device (e.g., 112) and via execution of a first trained machine learning model (e.g., 202), an object (e.g., whether or not a face) that is depicted in the document.

In various instances, act 906 can include computing, by the device (e.g., 114) and via execution of a second trained machine learning model (e.g., 402), a pose (e.g., 404) of the object.

In various cases, act 908 can include labeling, by the device (e.g., 116) and via execution of a third trained machine learning model (e.g., 602), the document as authentic or forged based on the pose of the object.

In various aspects, act 910 can include, in response to labeling the document as forged, transmitting, by the device (e.g., 118), an unsuccessful validation message to the computing device.

Although not explicitly shown in FIG. 9, it can be the case that the first trained machine learning model receives as input the document and produces as output a cropped image (e.g., 204) of the object.

Although not explicitly shown in FIG. 9, it can be the case that the object is depicted in the document in a non-upright orientation. In various instances, the first trained machine learning model can be a progressive calibration network that can align a bounding box with the object via a sequence of progressively finer rotations. In various aspects, the cropped image of the object can be in an upright orientation that corresponds to the bounding box once the bounding box has been aligned with the object.

Although not explicitly shown in FIG. 9, the progressive calibration network can comprise: a first sub-network that is trained to place the bounding box around the object and to rotate the bounding box by 0 degrees or 180 degrees based on the non-upright orientation of the object.

Although not explicitly shown in FIG. 9, the progressive calibration network can comprise: a second sub-network that is trained to rotate the bounding box outputted by the first sub-network by 0 degrees, 90 degrees clockwise, or 90 degrees counterclockwise based on the non-upright orientation of the object.

Although not explicitly shown in FIG. 9, the progressive calibration network can comprise: a third sub-network that is trained to rotate the bounding box outputted by the second sub-network by a continuous value ranging from 45 degrees clockwise to 45 degrees counterclockwise based on the non-upright orientation of the object, such that the bounding box is aligned with the object.

Figure 10:
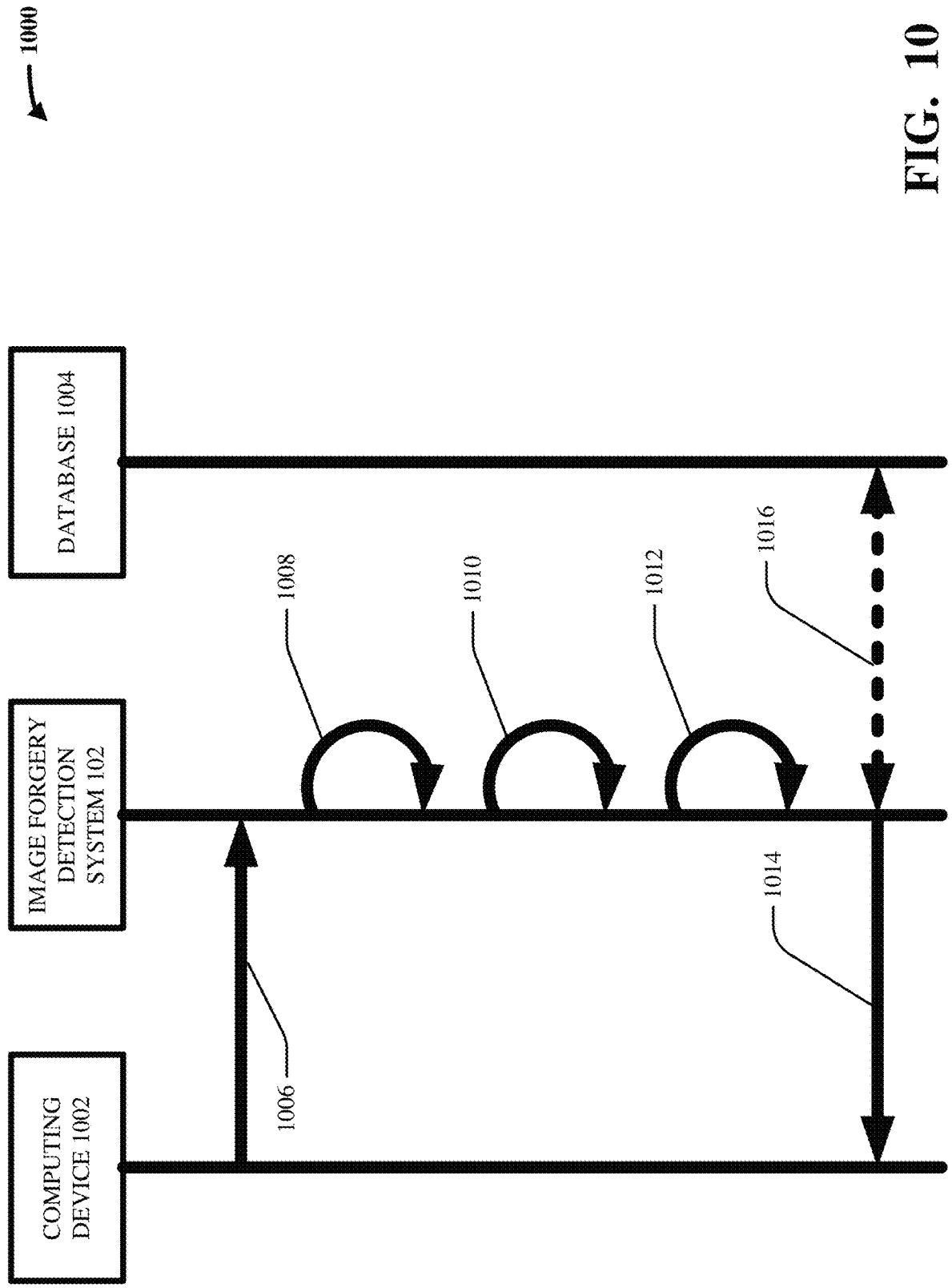
FIG. 10 illustrates a high-level communication diagram of an example, non-limiting workflow that facilitates image forgery detection via headpose estimation in accordance with one or more embodiments described herein.

FIG. 10 illustrates a high-level communication diagram of an example, non-limiting workflow 1000 that can facilitate image forgery detection via headpose estimation in accordance with one or more embodiments described herein. In other words, the workflow 1000 depicts a non-limiting example of how the image forgery detection system 102 can be implemented in practice. More specifically, the workflow 1000 depicts how the image forgery detection system 102 can perform a gatekeeping function.

In various embodiments, as shown, the image forgery detection system 102 can be electronically integrated, via any suitable wired and/or wireless electronic connections, with a computing device 1002 and/or with a database 1004. In various instances, an operator of the computing device 1002 can desire to either transmit data to and/or retrieve data from the database 1004. In various aspects, it can be required that the operator first present a valid proof-of-identity document before being permitted to retrieve data from and/or transmit data to the database 1004. In various instances, the image forgery detection system 102 can act as an intermediary between the computing device 1002 and the database 1004, so as to automatically validate a proof-of-identity document provided by the computing device 1002.

In various embodiments, at act 1006, the computing device 1002 can electronically transmit a scanned/captured image of a proof-of-identity document to the image forgery detection system 102, where the scanned/captured image of the proof-of-identity document can visually depict a face.

In various aspects, at act 1008, the image forgery detection system 102 can, via the face detection component 112 and/or the machine learning model 202, output a cropped image of the face.

In various instances, at act 1010, the image forgery detection system 102 can, via the headpose component 114 and/or the machine learning model 402, compute a headpose of the face depicted in the cropped image.

In various cases, at act 1012, the image forgery detection system 102 can, via the forgery component 116 and/or the machine learning model 602, classify the proof-of-identity document as authentic or forged, based on the computed headpose. If the image forgery detection system 102 classifies the proof-of-identity document as forged, the workflow 1000 can proceed to act 1014. Otherwise, the workflow 1000 can proceed to act 1016.

In various aspects, at act 1014, the image forgery detection system 102 can electronically transmit to the computing device 1002 a validation failure message, which can indicate and/or otherwise convey that the proof-of-identity document has been deemed forged. Accordingly, the image forgery detection system 102 can refrain from transmitting data to and/or retrieving data from the database 1004 on behalf of the computing device 1002.

In various instances, at act 1016, the image forgery detection system 102 can electronically transmit data to and/or electronically retrieve data from the database 1004, since the proof-of-identity document was deemed authentic.

Those having ordinary skill in the art will appreciate that FIG. 10 illustrates a mere non-limiting example of how the image forgery detection system 102 can perform a gatekeeping function (e.g., can perform certain actions if a proof-of-identity document is determined to be authentic; can perform other actions if a proof-of-identity document is determined to be forged).

Various embodiments described herein constitute a computerized tool that can electronically receive an electronic document that depicts a face (and/or any other object, in various cases), that can compute a pose (e.g., a yaw angle, a roll angle, and/or a pitch angle) of the face as depicted in the electronic document, and that can electronically infer an authenticity of the electronic document based on the computed pose. Various embodiments described herein can facilitate such functionality by implementing machine learning models (e.g., neural networks) that can be trained via any suitable training paradigm (e.g., supervised training, unsupervised training, reinforcement learning). For example, a first trained machine learning model can be configured to receive the electronic document and to produce as cropped image of the face that is depicted in the electronic document. In various cases, a second trained machine learning model can be configured to receive the cropped image and to output a yaw, roll, and/or pitch that describes the pose of the face depicted in the cropped image. In various aspects, a third trained machine learning model can be configured to receive the computed yaw, roll, and/or pitch and to output a label that classifies such yaw, roll, and/or pitch as corresponding to a forged document and/or to an authentic document. In various cases, the computerized tool can take any suitable computerized actions based on such authenticity determinations (e.g., can generate/transmit alerts/warnings based on the authenticity determinations, can function as a gatekeeper that permits and/or denies electronic access to sensitive data based on the authenticity determinations). Such a computerized tool certainly constitutes a useful and practical application of computers.

To facilitate some of the above-described machine learning aspects of various embodiments of the subject innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 11:
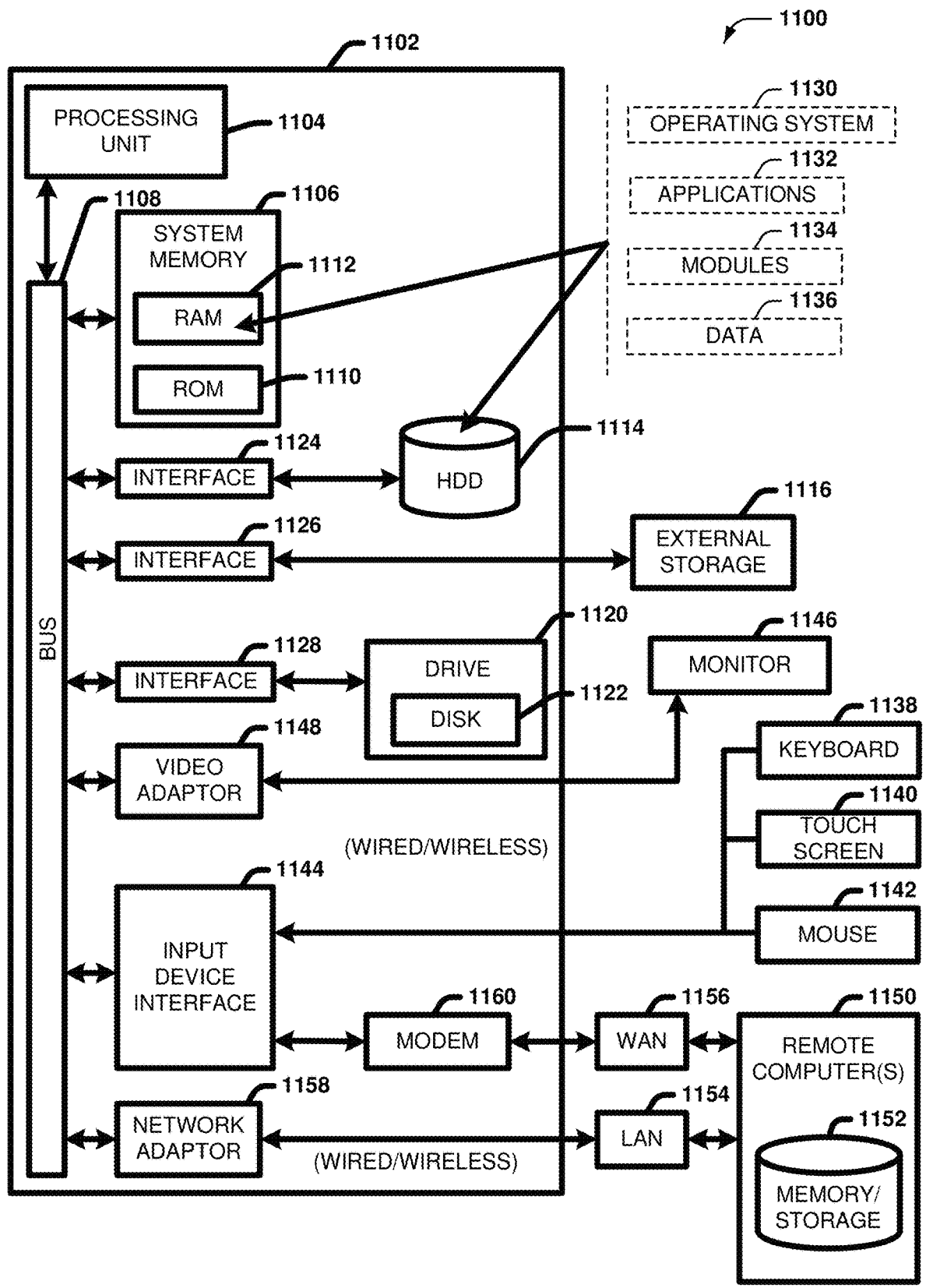
FIG. 11 illustrates a block diagram of an example, non-limiting operating environment in which one or more embodiments described herein can be facilitated.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid state drive, an optical disk drive, which can read or write from a disk 1122, such as a CD-ROM disc, a DVD, a BD, etc. Alternatively, where a solid state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above, such as but not limited to a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or an ad hoc communication between at least two devices.

Figure 12:
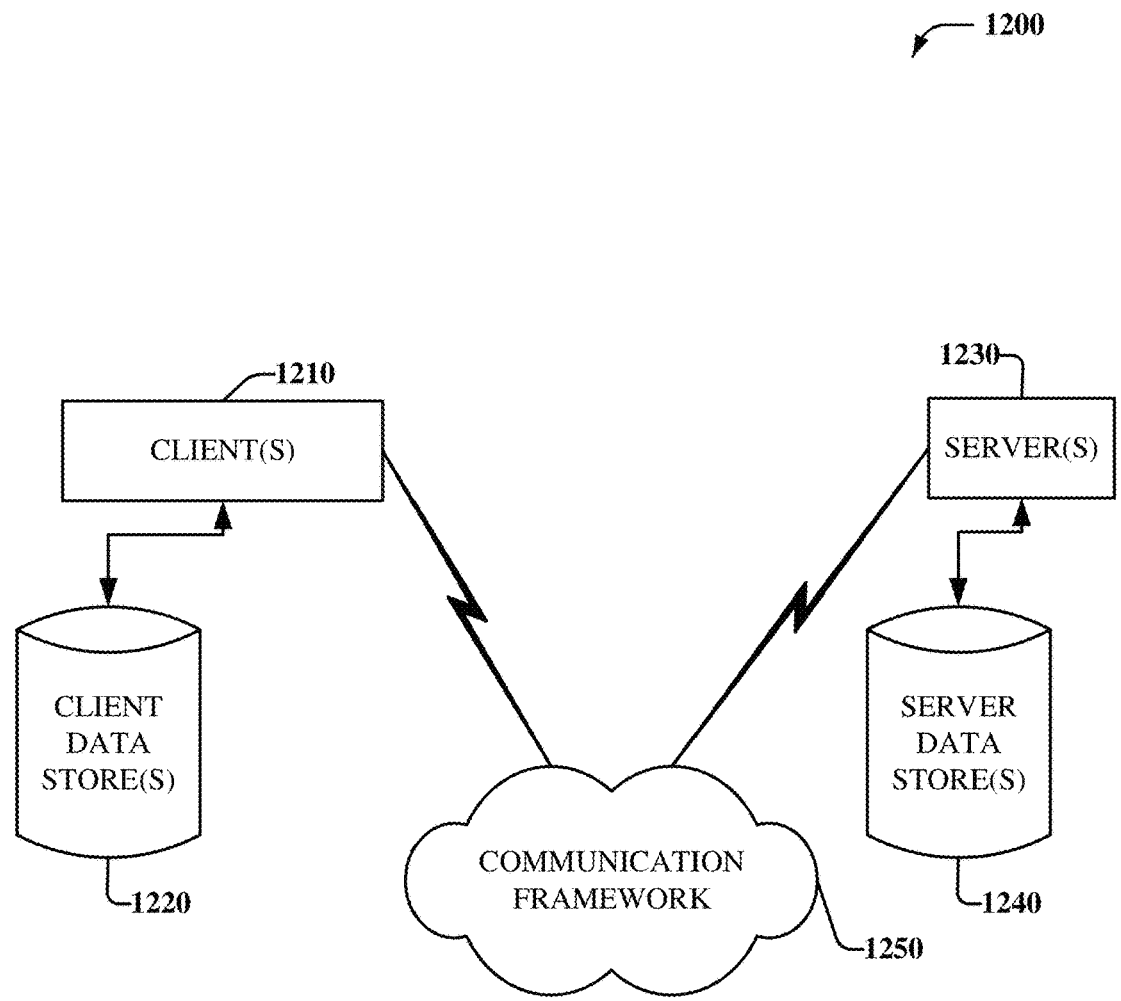
FIG. 12 illustrates an example networking environment operable to execute various implementations described herein.

FIG. 12 is a schematic block diagram of a sample computing environment 1200 with which the disclosed subject matter can interact. The sample computing environment 1200 includes one or more client(s) 1210. The client(s) 1210 can be hardware and/or software (e.g., threads, processes, computing devices). The sample computing environment 1200 also includes one or more server(s) 1230. The server(s) 1230 can also be hardware and/or software (e.g., threads, processes, computing devices). The servers 1230 can house threads to perform transformations by employing one or more embodiments as described herein, for example. One possible communication between a client 1210 and a server 1230 can be in the form of a data packet adapted to be transmitted between two or more computer processes. The sample computing environment 1200 includes a communication framework 1250 that can be employed to facilitate communications between the client(s) 1210 and the server(s) 1230. The client(s) 1210 are operably connected to one or more client data store(s) 1220 that can be employed to store information local to the client(s) 1210. Similarly, the server(s) 1230 are operably connected to one or more server data store(s) 1240 that can be employed to store information local to the servers 1230.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer-executable instructions stored in a computer-readable memory, which causes the processor to:
        receive a document from a client device;
        identify, by executing a first trained machine learning model, an object that is depicted in the document;
        determine, by executing a second trained machine learning model, a single pose of the object; and
        determine, by executing a third trained machine learning model, whether the document is authentic or forged based solely on the single pose of the object without comparing the object depicted in the document to another object.

2. The system of claim 1, wherein the computer-executable instructions are further executable to cause the processor to:
    in response to determining that the document is forged, transmit a signal indicative of an unsuccessful validation message to the client device.

3. The system of claim 1, wherein the first trained machine learning model receives as input the document and produces as output a cropped image of the object.

4. The system of claim 3, wherein the object is depicted in the document in a non-upright orientation, wherein the first trained machine learning model is a progressive calibration network that aligns a bounding box with the object via a sequence of progressively finer rotations, and wherein the cropped image of the object is in an upright orientation that corresponds to the bounding box once the bounding box is aligned with the object.

5. The system of claim 4, wherein the progressive calibration network comprises:

a first sub-network that is trained to place the bounding box around the object and to rotate the bounding box by 0 degrees or 180 degrees based on the non-upright orientation of the object.

6. The system of claim 5, wherein the progressive calibration network further comprises:
    a second sub-network that is trained to rotate the bounding box outputted by the first subnetwork by 0 degrees, 90 degrees clockwise, or 90 degrees counterclockwise based on the nonupright orientation of the object.

7. The system of claim 6, wherein the progressive calibration network further comprises:
    a third sub-network that is trained to rotate the bounding box outputted by the second sub-network by a continuous value ranging from 45 degrees clockwise to 45 degrees counterclockwise based on the non-upright orientation of the object, such that the bounding box is aligned with the object.

8. A computer-implemented method, comprising:
    accessing, by a device operatively coupled to a processor, a document provided by a computing device;
    detecting, by the device and via execution of a first trained neural network, an object that is depicted in the document;
    computing, by the device and via execution of a second trained neural network, a single pose of the object; and
    labeling, by the device and via execution of a third trained neural network, the document as authentic or forged based solely on the single pose of the object without comparing the object depicted in the document to another object.

9. The computer-implemented method of claim 8, further comprising:
    in response to labeling the document as forged, transmitting, by the device, a signal indicative of an unsuccessful validation message to the computing device.

10. The computer-implemented method of claim 8, wherein the first trained neural network receives as input the document and produces as output a cropped image of the object.

11. The computer-implemented method of claim 10, wherein the object is depicted in the document in a non-upright orientation, wherein the first trained neural network is a progressive calibration network that aligns a bounding box with the object via a sequence of progressively finer rotations, and wherein the cropped image of the object is in an upright orientation that corresponds to the bounding box once the bounding box is aligned with the object.

12. The computer-implemented method of claim 11, wherein the progressive calibration network comprises:
    a first sub-network that is trained to place the bounding box around the object and to rotate the bounding box by 0 degrees or 180 degrees based on the non-upright orientation of the object.

13. The computer-implemented method of claim 12, wherein the progressive calibration network further comprises:
    a second sub-network that is trained to rotate the bounding box outputted by the first subnetwork by 0 degrees, 90 degrees clockwise, or 90 degrees counterclockwise based on the nonupright orientation of the object.

14. The computer-implemented method of claim 13, wherein the progressive calibration network further comprises:
    a third sub-network that is trained to rotate the bounding box outputted by the second sub-network by a continuous value ranging from 45 degrees clockwise to 45 degrees counterclockwise based on the non-upright orientation of the object, such that the bounding box is aligned with the object.

15. A computer program product for facilitating image forgery detection via headpose estimation, the computer program product comprising a non-transitory computer-readable memory having program instructions embodied therewith, the program instructions executable by a processor to cause the processor to:
acquire a scanned image of a proof-of-identity document;
recognize, by executing a first trained artificial intelligence algorithm, a face depicted in the scanned image of the proof-of-identity document;
estimate, by executing a second trained artificial intelligence algorithm, a single headpose of the face; and
classify, by executing a third trained artificial intelligence algorithm, an authenticity of the proof-of-identity document based solely on the single headpose of the face without comparing the face depicted in the scanned image to another face.

16. The computer program product of claim 15, wherein the scanned image of the proof-of-identity document is provided by a computing device, and wherein the program instructions are further executable to cause the processor to:
in response to classifying the proof-of-identity document as forged, relay a failure message to the computing device.

17. The computer program product of claim 15, wherein the first trained artificial intelligence algorithm receives as input the scanned image of the proof-of-identity document and produces as output a cropped image of the face.

18. The computer program product of claim 17, wherein the face is depicted in the scanned image of the proof-of-identity document in a non-upright orientation, wherein the first trained artificial intelligence algorithm is a progressive calibration network that aligns a bounding box with the face via a sequence of progressively finer rotations, and wherein the cropped image of the face is in an upright orientation that corresponds to the bounding box once the bounding box is aligned with the face.

19. The computer program product of claim 18, wherein the progressive calibration network is an ensemble of sub-networks.

20. The computer-program product of claim 17, wherein the second trained artificial intelligence algorithm receives as input the cropped image of the face and produces as output a yaw angle, a roll angle, and a pitch angle that collectively define the single headpose of the face.

* * * * *